US012676361B2

(12) United States Patent
Taniguchi et al.

(10) Patent No.: US 12,676,361 B2
(45) Date of Patent: Jul. 7, 2026

(54) VEHICLE, HEAT EXCHANGER PLATE AND BATTERY PACK

(71) Applicant: PANASONIC INTELLECTUAL PROPERTY MANAGEMENT CO., LTD., Osaka (JP)

(72) Inventors: Katsuji Taniguchi, Kanagawa (JP); Yoshitoshi Noda, Kanagawa (JP); Yuki Makita, Kanagawa (JP); Atsushi Sueyoshi, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 965 days.

(21) Appl. No.: 17/946,475

(22) Filed: Sep. 16, 2022

(65) Prior Publication Data

US 2023/0021121 A1      Jan. 19, 2023

Related U.S. Application Data

(63) Continuation of application No. PCT/JP2021/002423, filed on Jan. 25, 2021.

(30) Foreign Application Priority Data

Mar. 27, 2020   (JP) ................................. 2020-058577
Mar. 31, 2020   (JP) ................................. 2020-064389

(Continued)

(51) Int. Cl.
*H01M 10/6568*       (2014.01)
*B60K 1/04*       (2019.01)
(Continued)

(52) U.S. Cl.
CPC .......... *H01M 10/6568* (2015.04); *B60K 1/04* (2013.01); *B60K 11/02* (2013.01); *B60L 50/64* (2019.02);
(Continued)

(58) Field of Classification Search
None
See application file for complete search history.

(56) References Cited

U.S. PATENT DOCUMENTS

2010/0285347 A1     11/2010   Saito
2011/0262794 A1 *   10/2011   Yoon ................. H01M 10/6567
                                                                           429/120
(Continued)

FOREIGN PATENT DOCUMENTS

CN          107112612 A       8/2017
CN          107732371 A   *   2/2018   .......... H01M 10/625
(Continued)

OTHER PUBLICATIONS

English Translation for JP_2020017358_A (Year: 2020).*
(Continued)

*Primary Examiner* — Niki Bakhtiari
*Assistant Examiner* — Dustin Van Kirk
(74) *Attorney, Agent, or Firm* — Greenblum & Bernstein, P.L.C.

(57) ABSTRACT

A vehicle includes a first heat exchanger plate and a second heat exchanger plate. The first heat exchanger plate includes a first coolant layer in which a coolant flows and a refrigerant layer in which a refrigerant flows, and the second heat exchanger plate includes a second coolant layer in which the coolant flows. The first coolant layer and the second coolant layer are connected to each other via a coolant layer connection passage.

18 Claims, 15 Drawing Sheets

(30) Foreign Application Priority Data

| Mar. 31, 2020 | (JP) | ................................ | 2020-064390 |
| Mar. 31, 2020 | (JP) | ................................ | 2020-064391 |
| Mar. 31, 2020 | (JP) | ................................ | 2020-064392 |

(51) Int. Cl.

| | |
|---|---|
| *B60K 11/02* | (2006.01) |
| *B60L 50/64* | (2019.01) |
| *B60L 58/26* | (2019.01) |
| *H01M 10/613* | (2014.01) |
| *H01M 10/625* | (2014.01) |

(52) U.S. Cl.

CPC ........... *B60L 58/26* (2019.02); *H01M 10/613* (2015.04); *H01M 10/625* (2015.04); *H01M 2220/20* (2013.01)

(56) References Cited

U.S. PATENT DOCUMENTS

| | | | |
|---|---|---|---|
| 2012/0183822 A1* | 7/2012 | Chung | ................ H01M 10/613 |
| | | | 429/72 |
| 2016/0204486 A1 | 7/2016 | Al. | |
| 2017/0151979 A1 | 6/2017 | Maeda et al. | |
| 2018/0241102 A1 | 8/2018 | Kim et al. | |
| 2019/0176571 A1 | 6/2019 | Oh et al. | |
| 2019/0207280 A1 | 7/2019 | Kenney et al. | |
| 2019/0363411 A1* | 11/2019 | Takeuchi | .......... H01M 10/6552 |
| 2020/0006820 A1* | 1/2020 | Cha | ................... H01M 10/6556 |
| 2020/0259229 A1 | 8/2020 | Wu | |
| 2022/0255163 A1 | 8/2022 | Kenney et al. | |
| 2024/0039080 A1 | 2/2024 | Kenney et al. | |

FOREIGN PATENT DOCUMENTS

| | | | |
|---|---|---|---|
| CN | 108711659 A | 10/2018 | |
| DE | 102010025525 A | 1/2011 | |
| DE | 102011090146 A | 7/2013 | |
| JP | 2002-171685 A | 6/2002 | |
| JP | 2010-050000 A | 3/2010 | |
| JP | 2010-092722 A | 4/2010 | |
| JP | 2010-262870 A | 11/2010 | |
| JP | 2001-313091 A | 11/2011 | |
| JP | 5078463 B2 * | 11/2012 | |
| JP | 2014-187772 A | 10/2014 | |
| JP | 2014-235897 A | 12/2014 | |
| JP | 2017-105424 A | 6/2017 | |
| JP | 2018-024305 A | 2/2018 | |
| JP | 2018-533167 A | 11/2018 | |
| JP | 2019-016584 A | 1/2019 | |
| JP | 2019-119437 A | 7/2019 | |
| JP | 2020009694 A * | 1/2020 | .......... H01M 10/613 |
| JP | 2020017358 A * | 1/2020 | |
| KR | 101764611 B1 * | 8/2017 | .............. F28F 27/02 |
| WO | 2011/000826 A1 | 1/2011 | |
| WO | 2019/062951 A1 | 4/2019 | |
| WO | WO-2019139022 A1 * | 7/2019 | ........ H01M 10/6556 |
| WO | WO-2019155810 A1 * | 8/2019 | .......... H01M 50/204 |

OTHER PUBLICATIONS

English Translation for WO_2019139022_A1 (Year: 2019).*

Notice of Reasons for Refusal issued in Japan Counterpart Patent Appl. No. 2020-058577, dated Jun. 29, 2021, along with an English translation thereof.

Notice of Reasons for Refusal issued in Japan Counterpart Patent Appl. No. 2020-058577, dated Mar. 9, 2021, along with an English translation thereof.

Notice of Reasons for Refusal issued in Japan Counterpart Patent Appl. No. 2020-064391, dated Dec. 7, 2021, along with an English translation thereof.

International Search Report issued in International Bureau of Wipo Patent Application No. PCT/JP2021/002423, dated Apr. 13, 2021.

Written Opinion of the International Searching Authority issued in International Bureau of WIPO Patent Application No. PCT/JP2021/002423, dated Apr. 13, 2021, along with an English translation thereof.

Office Action issued in Chinese family member Patent Appl. No. 202180022967.8, dated Jan. 27, 2025, along With an English translation thereof.

Office Action issued in German family member Patent Appl. No. 112021001959.7, dated Jan. 16, 2024, along with an English translation thereof.

Office Action issued in Japanese family member Patent Appl. No. 2023-158822, dated Jun. 4, 2024, along with an English translation thereof.

* cited by examiner

*FIG. 1*
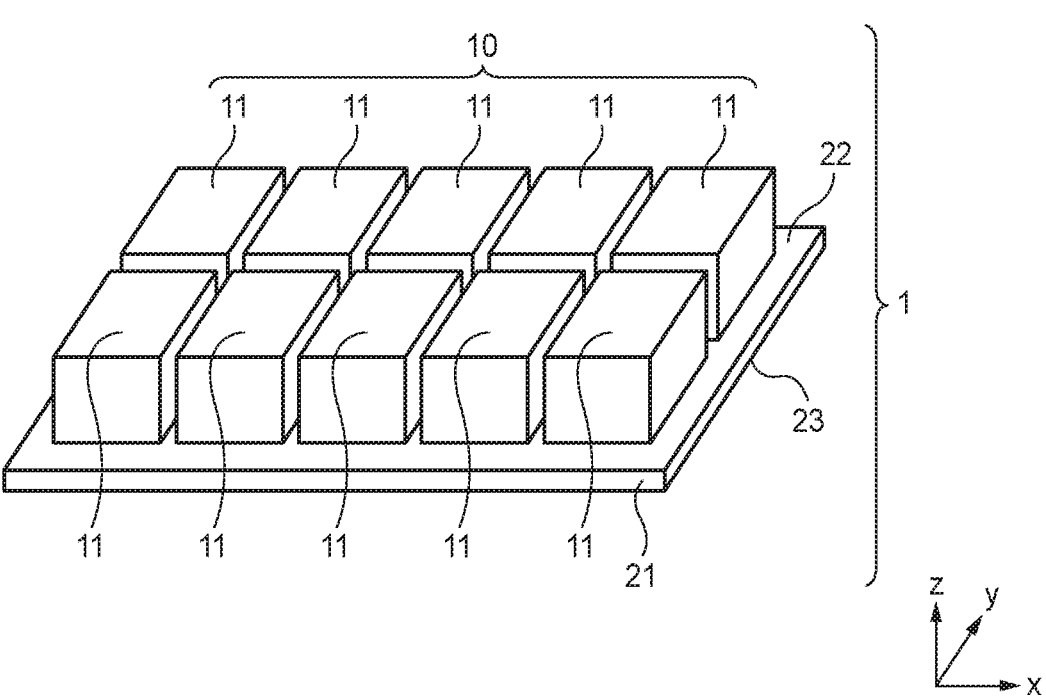
*FIG. 2*
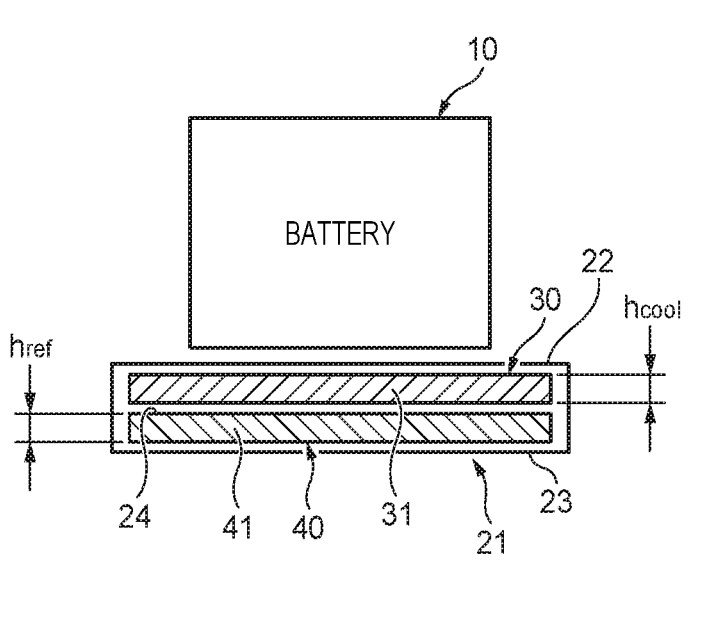
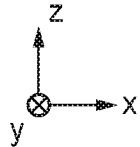

COOLING RATE MEASUREMENT, PLATE
COOLING SURFACE AVERAGE TRANSITION

FIG. 9
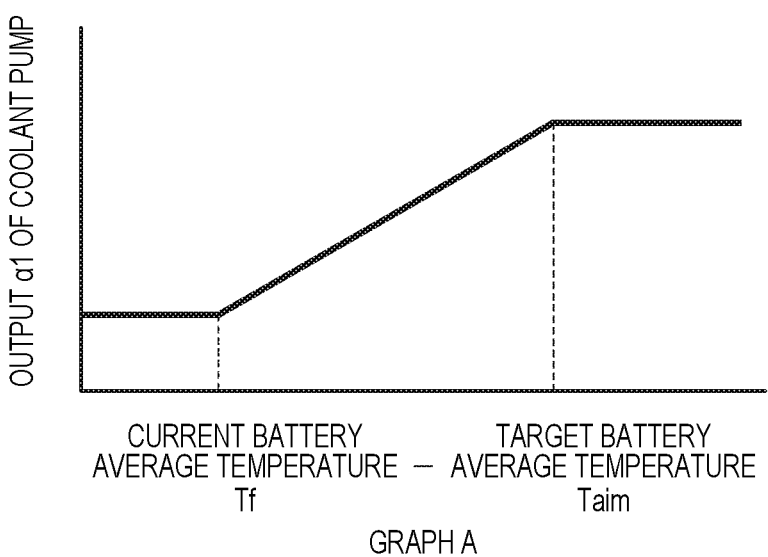
GRAPH A
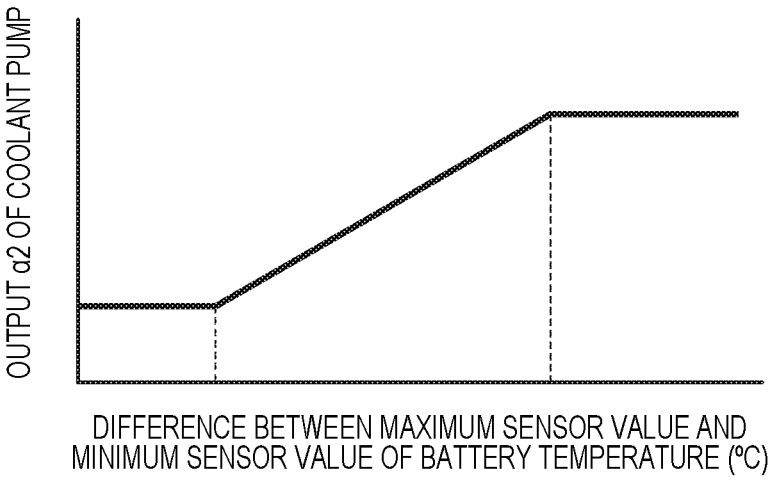
GRAPH B

FIG. 10

|  | LOW ROTATION SPEED | HIGH ROTATION SPEED |
|---|---|---|
| OIL CIRCULATION RATE IN SYSTEM | 0.7 % | 8 % |
| OIL AMOUNT IN PLATE | 2 g OR LESS | 30 g |

FIG. 11

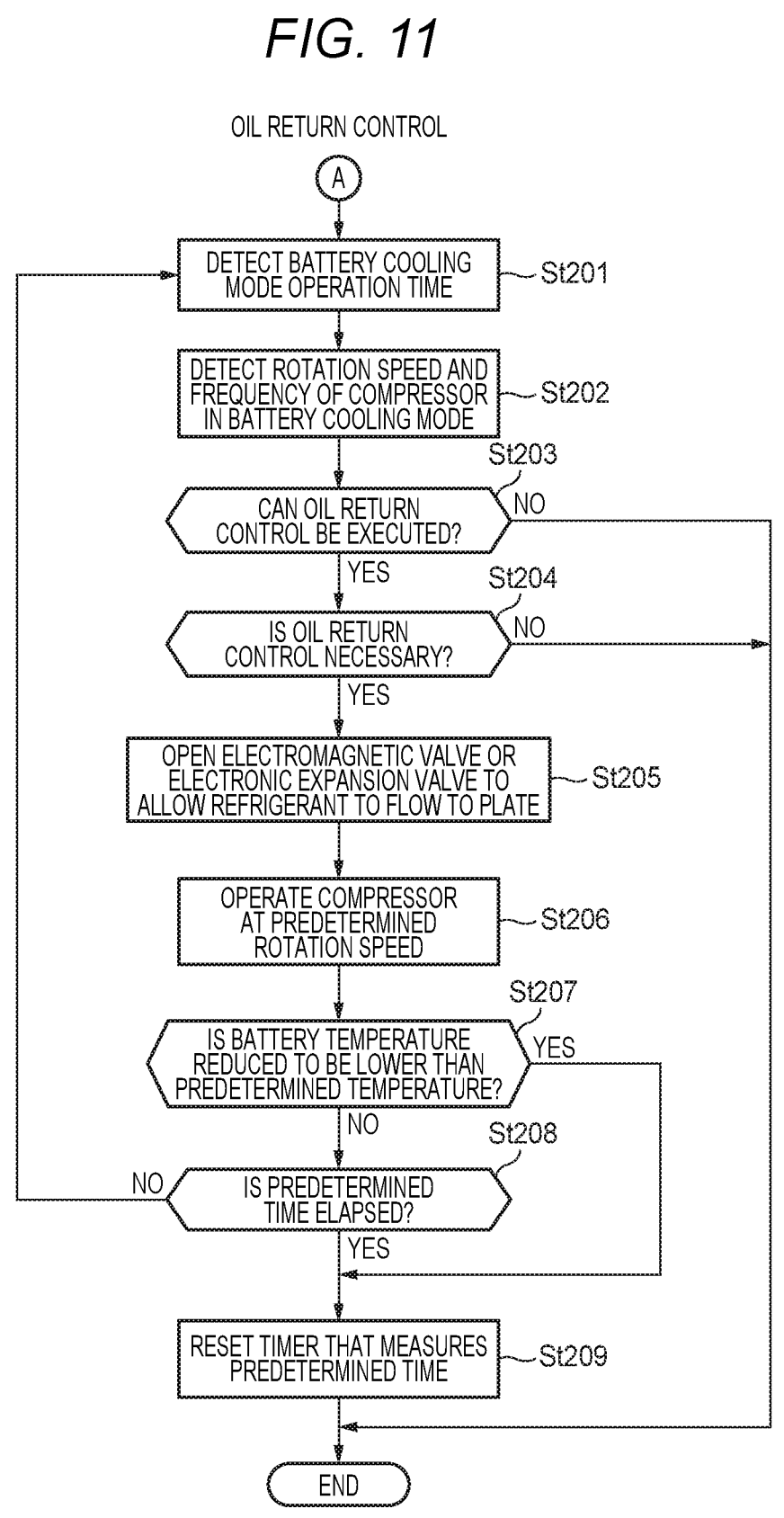

OIL RETURN CONTROL (A)

DETECT BATTERY COOLING
MODE OPERATION TIME — St201

DETECT ROTATION SPEED AND
FREQUENCY OF COMPRESSOR — St202
IN BATTERY COOLING MODE

St203

CAN OIL RETURN
CONTROL BE EXECUTED?    NO

YES    St204

IS OIL RETURN
CONTROL NECESSARY?    NO

YES

OPEN ELECTROMAGNETIC VALVE OR
ELECTRONIC EXPANSION VALVE TO — St205
ALLOW REFRIGERANT TO FLOW TO PLATE

OPERATE COMPRESSOR
AT PREDETERMINED — St206
ROTATION SPEED

St207

IS BATTERY TEMPERATURE
REDUCED TO BE LOWER THAN    YES
PREDETERMINED TEMPERATURE?

NO    St208

NO    IS PREDETERMINED
TIME ELAPSED?

YES

RESET TIMER THAT MEASURES — St209
PREDETERMINED TIME

END (FIG. 13 CONTINUED)
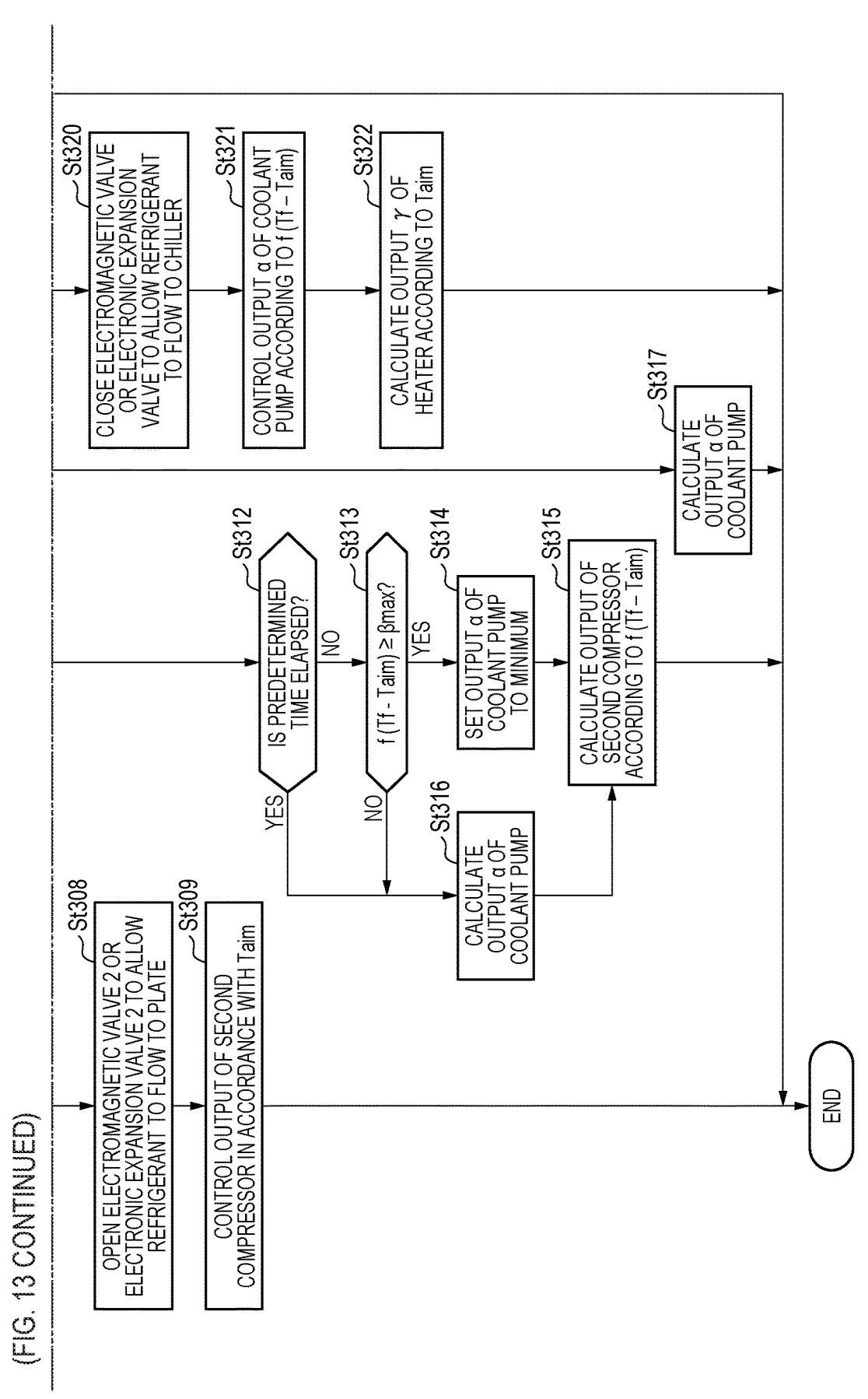

VEHICLE, HEAT EXCHANGER PLATE AND BATTERY PACK

CROSS-REFERENCE TO RELATED APPLICATIONS

This is a continuation of International Application No. PCT/JP2021/002423 filed on Jan. 25, 2021, and claims priority from Japanese Patent Application No. 2020-058577 filed on Mar. 27, 2020, Japanese Patent Application No. 2020-064389 filed on Mar. 31, 2020, Japanese Patent Application No. 2020-064390 filed on Mar. 31, 2020, Japanese Patent Application No. 2020-064391 filed on Mar. 31, 2020, and Japanese Patent Application No. 2020-064392 filed on Mar. 31, 2020, the entire content of which is incorporated herein by reference.

TECHNICAL FIELD

The present disclosure relates to a vehicle, a heat exchanger plate, and a battery pack.

BACKGROUND ART

An in-vehicle battery that supplies electric power to a motor which is a drive source is mounted on a hybrid vehicle or an electric vehicle. In order to prevent a temperature rise of the in-vehicle battery, a heat exchanger in which a refrigerant and a coolant are supplied at the same time is disclosed (see JP2010-050000A).

JP2010-050000A discloses a vehicle power supply device including a battery block formed by coupling a plurality of battery cells, a cooling plate that is thermally coupled to the battery cells and configured to cool the battery cells using a supplied refrigerant, a cooling mechanism configured to supply a refrigerant to the cooling plate, and a control circuit configured to control the cooling mechanism and control a cooling state of the cooling plate, and discloses that a temperature difference among the battery cells is reduced to prevent adverse effects due to unbalance of the battery cells while efficiently and quickly cooling the battery.

SUMMARY OF INVENTION

An object of the present disclosure is to provide a hybrid heat exchanger plate using a refrigerant and a coolant, a vehicle including the heat exchanger plate, and a battery pack.

The present disclosure provides a vehicle including: a refrigerant circuit including a compressor, a condenser, an expansion valve, and an evaporator, the refrigerant circuit being configured to circulate a refrigerant; a coolant circuit including a reservoir and a pump, the coolant circuit being configured to circulate a coolant; a first heat exchanger plate having a first surface and a second surface opposite to the first surface, the first heat exchanger plate including a first coolant layer in which the coolant flows between the first surface and the second surface and a refrigerant layer in which the refrigerant flows between the first surface and the second surface; a first battery module group including a plurality of first battery modules, the first battery module group being disposed along the first surface of the first heat exchanger plate; a second heat exchanger plate having a third surface and a fourth surface opposite to the third surface, the second heat exchanger including a second coolant layer in which the coolant flows between the third surface and the fourth surface; a second battery module group including a plurality of second battery modules, the second battery group being disposed along the third surface of the second heat exchanger plate; a vehicle body that houses the refrigerant circuit, the coolant circuit, the first heat exchanger plate, the first battery module group, the second heat exchanger plate, and the second battery module group; a first wheel and a second wheel that are coupled to the vehicle body; and an electric motor configured to drive the first wheel using electric power supplied from at least one of the first battery module group and the second battery module group, wherein the vehicle is allowed to travel in a first direction using the first wheel and the second wheel, wherein at least a part of the first coolant layer is disposed to overlap the refrigerant layer, wherein the first heat exchanger plate comprises a refrigerant input portion through which the refrigerant enters the refrigerant layer and a refrigerant output portion through which the refrigerant exits from the refrigerant layer, and the refrigerant circuit is connected to the refrigerant input portion and the refrigerant output portion, wherein the first heat exchanger plate comprises a coolant input portion through which the coolant enters the first coolant layer and a coolant output portion through which the coolant exits from the first coolant layer, and the coolant circuit is connected to the coolant input portion and the coolant output portion, and wherein the first coolant layer and the second coolant layer are connected to each other via a coolant layer connection passage.

The present disclosure provides a heat exchanger plate including: a first surface; a second surface opposite to the first surface; a first coolant layer in which a coolant flows between the first surface and the second surface; and a refrigerant layer in which a refrigerant flows between the first surface and the second surface, wherein the heat exchanger plate is allowed to be housed in a vehicle body including a first battery module group, and the first battery module group comprises a plurality of first battery modules and is disposed along the first surface, wherein the vehicle body is allowed to further house: a refrigerant circuit including a compressor, a condenser, an expansion valve, and an evaporator, the refrigerant circuit being configured to circulate the refrigerant; a coolant circuit including a reservoir and a pump, the coolant circuit being configured to circulate the coolant; a second heat exchanger plate having a third surface and a fourth surface opposite to the third surface, the second heat exchanger plate including a second coolant layer in which the coolant flows between the third surface and the fourth surface; and a second battery module group including a plurality of second battery modules, the second battery module group being disposed along the third surface of the second heat exchanger plate, wherein the vehicle body is allowed to form a vehicle to which a first wheel and a second wheel are coupled, the vehicle comprises an electric motor configured to drive the first wheel using electric power supplied from at least one of the first battery module group and the second battery module group, and the vehicle is allowed to travel in a first direction using the first wheel and the second wheel, wherein at least a part of the first coolant layer is disposed to overlap the refrigerant layer, wherein the refrigerant layer comprises a refrigerant input portion through which the refrigerant enters the refrigerant layer and a refrigerant output portion through which the refrigerant exits from the refrigerant layer, and the refrigerant input portion and the refrigerant output portion are connectable to the refrigerant circuit, wherein the first coolant layer comprises a coolant input portion through which the coolant enters the first coolant layer and a coolant output portion through which the coolant exits from the first coolant layer, and the coolant input portion and the coolant output portion are connectable to the coolant circuit, and wherein the first coolant layer and the second coolant layer are connectable to each other via a coolant layer connection passage.

The present disclosure provides a battery pack including: a first heat exchanger plate having a first surface and a second surface opposite to the first surface, the first heat exchanger plate including a coolant layer in which a coolant flows between the first surface and the second surface and a refrigerant layer in which a refrigerant flows between the first surface and the second surface; and a first battery module group including a plurality of first battery modules, the first battery module group being disposed along the first surface, wherein the battery pack is allowed to be housed in a vehicle body, wherein the vehicle body is allowed to further house: a refrigerant circuit including a compressor, a condenser, an expansion valve, and an evaporator, the refrigerant circuit being configured to circulate the refrigerant; a coolant circuit including a reservoir and a pump, the coolant circuit being configured to circulate the coolant; a second heat exchanger plate having a third surface and a fourth surface opposite to the third surface, the second heat exchanger plate including a second coolant layer in which the coolant flows between the third surface and the fourth surface; and a second battery module group including a plurality of second battery modules, the second battery module group being disposed along the third surface of the second heat exchanger plate, wherein the vehicle body is allowed to form a vehicle to which a first wheel and a second wheel are coupled, the vehicle comprises an electric motor configured to drive the first wheel using electric power supplied from at least one of the first battery module group and the second battery module group, and the vehicle is allowed to travel in a first direction using the first wheel and the second wheel, wherein at least a part of the first coolant layer is disposed to overlap the refrigerant layer, wherein the first heat exchanger plate comprises a refrigerant input portion through which the refrigerant enters the refrigerant layer and a refrigerant output portion through which the refrigerant exits from the refrigerant layer, and the refrigerant input portion and the refrigerant output portion are connectable to the refrigerant circuit, wherein the first heat exchanger plate comprises a coolant input portion through which the coolant enters the first coolant layer and a coolant output portion through which the coolant exits from the first coolant layer, and the coolant input portion and the coolant output portion are connectable to the coolant circuit, and wherein the first coolant layer and the second coolant layer are connectable to each other via a coolant layer connection passage.

According to the present disclosure, it is possible to provide a hybrid heat exchanger plate using a refrigerant and a coolant, a vehicle including the heat exchanger plate, and a battery pack.

BRIEF DESCRIPTION OF DRAWINGS

FIG. 1 is a conceptual diagram showing a heat exchanger plate 21 that adjusts the temperature of a battery module group 10.

FIG. 2 is a cross-sectional view showing the battery module group 10 and the heat exchanger plate 21.

FIG. 9 are two types of graphs (a graph A and a graph B) showing a calculation logic for calculating an output value of a pump P.

FIG. 10 is a table summarizing experimental results showing a state of compressor oil in accordance with a rotation speed of a compressor.

FIG. 11 is a flowchart showing an example of an oil return control.

FIGS. 14A and 14B are diagrams showing a heat exchanger plate 70 according to a modification that can be used in the battery temperature adjustment system 1 or 1B according to the present disclosure, in which FIG. 14A is a top view and FIG. 14B is a side cross-sectional view showing a state in which the battery module group 10 is mounted.

FIGS. 15A and 15B are diagrams showing the heat exchanger plate 70 according to a modification that further includes a third heat exchanger plate 21C that does not have a refrigerant layer 40, in which FIG. 15A is a top view and FIG. 15B is a side cross-sectional view showing a state in which the battery module group 10 is mounted.

DESCRIPTION OF EMBODIMENTS

Figure 3:
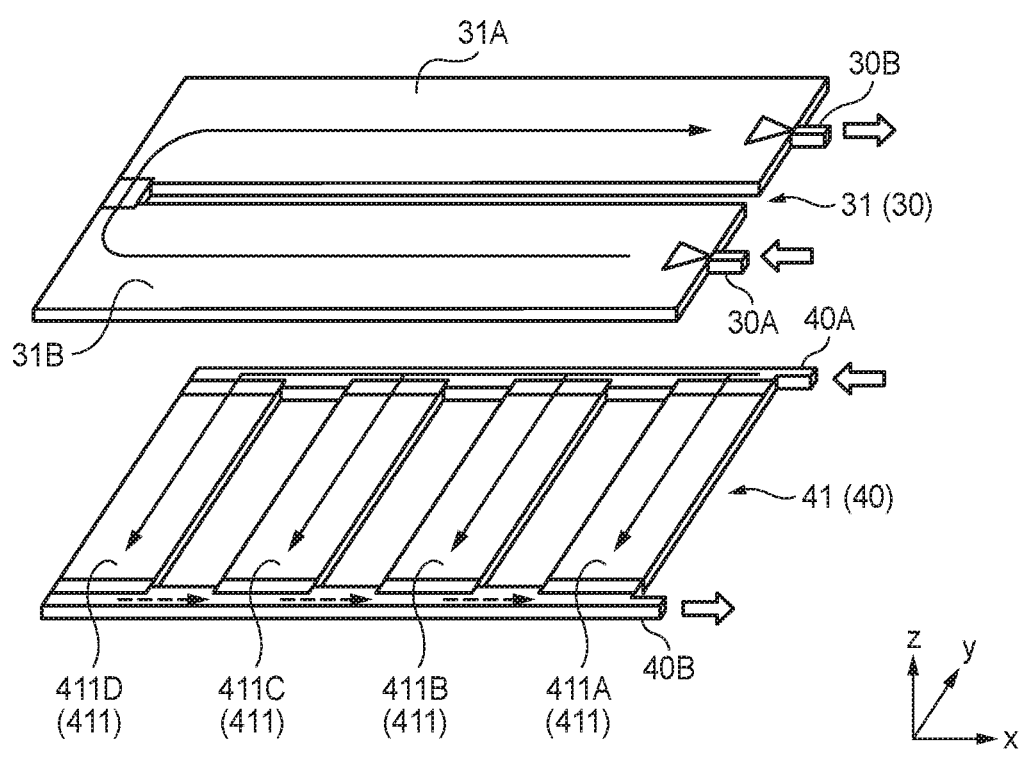
FIG. 3 is an exploded perspective view showing the heat exchanger plate 21 shown in FIG. 1.

Hereinafter, an embodiment (hereinafter, referred to as "the present embodiment") specifically disclosing a vehicle, a heat exchanger plate, and a battery pack according to the present disclosure will be described in detail with reference to the drawings as appropriate. Unnecessary detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following descriptions are provided for those skilled in the art to have a thorough understanding of the present disclosure, and are not intended to limit a subject matter recited in the claims.

First Embodiment

FIG. 1 is a conceptual diagram showing a heat exchanger plate 21 that adjusts the temperature of a battery module group 10.

The battery module group 10 includes a plurality of battery modules 11. The battery modules 11 are, for example, a battery that accumulates electric energy serving as a drive source of a traveling motor in a hybrid vehicle or an electric vehicle, and is a component that requires temperature adjustment such as cooling or heating.

The heat exchanger plate 21 adjusts the temperature of the battery modules 11 included in the battery module group 10 using a coolant and a refrigerant which will be described later. The heat exchanger plate 21 has a first surface 22 and a second surface 23 opposite to the first surface 22. As shown in the drawing, the battery module group 10 is disposed along the first surface 22 of the heat exchanger plate 21. In FIG. 1, five battery modules 11 are arranged on the first surface 22 of the heat exchanger plate 21 in each of two rows, and the arrangement of the battery modules 11 is not particularly limited. Therefore, the plurality of battery modules 11 may be collectively shown and referred to as one member in the following description.

Here, in order to facilitate understanding, an orthogonal coordinate system including an x axis, a y axis, and a z axis is defined as shown in each drawing. The z axis is perpendicular to the x axis and the y axis. A positive direction of each axis is defined as a direction of an arrow in FIG. 1, and a negative direction is defined as a direction opposite to the arrow. Here, the positive direction side of the x axis may be referred to as a "front side", the negative direction side of the x axis may be referred to as a "rear side", the positive direction side of the y axis may be referred to as a "right side", the negative direction side of the y axis may be referred to as a "left side", the positive direction side of the z axis may be referred to as an "upper side", and the negative direction side of the z axis may be referred to as a "lower side".

FIG. 2 is a cross-sectional view showing the battery module group 10 and the heat exchanger plate 21.

Similar to the arrangement shown in FIG. 1, the battery module group 10 is disposed along the first surface 22 of the heat exchanger plate 21. The heat exchanger plate 21 includes a coolant layer 30 and a refrigerant layer 40. In the coolant layer 30, a coolant flows between the first surface 22 and the second surface 23 of the heat exchanger plate 21 (see FIG. 3). The coolant is, for example, an antifreeze solution containing ethylene glycol. In the refrigerant layer 40, a refrigerant flows between the first surface 22 and the second surface 23 of the heat exchanger plate 21 (see FIG. 3). The refrigerant may be in a two-phase state in which gas and liquid are mixed, and is, for example, hydrofluorocarbon (HFC). Alternatively, the refrigerant may be a refrigerant other than HFC. An intermediate surface 24 may be provided between the coolant layer 30 and the refrigerant layer 40. The intermediate surface 24 is disposed between the first surface 22 and the second surface 23.

At least a part of the coolant layer 30 is disposed to overlap the refrigerant layer 40. In the configuration example shown in FIG. 2, the coolant layer 30 is disposed to overlap substantially the entire refrigerant layer 40. Alternatively, for example, in a case where a dimension of the refrigerant layer 40 in the x axis direction is smaller than a dimension of the coolant layer 30 in the x axis direction, a part of the coolant layer 30 overlaps the refrigerant layer 40. In this case, heat exchange is performed between the coolant and the refrigerant in a portion where the coolant layer 30 and the refrigerant layer 40 overlap each other. Although not shown, the refrigerant layer 40 having a small dimension in the x axis direction may be embedded in the vicinity of the center of the coolant layer 30 having a large dimension in the x axis direction.

In a portion where the coolant layer 30 and the refrigerant layer 40 overlap each other, the coolant layer 30 may be disposed between the refrigerant layer 40 and the battery module group 10. In the configuration example shown in FIG. 2, the coolant layer 30 is disposed above the refrigerant layer 40 (at a side closer to the battery module group 10). Alternatively, a positional relationship between the coolant layer 30 and the refrigerant layer 40 may be reversed. That is, in the portion where the coolant layer 30 and the refrigerant layer 40 overlap each other, the refrigerant layer 40 may be disposed between the coolant layer 30 and the battery module group 10.

The coolant layer 30 includes a coolant passage 31 through which a coolant flows. The refrigerant layer 40 includes a refrigerant passage 41 through which a refrigerant flows. A volume of the refrigerant passage 41 may be smaller than a volume of the coolant passage 31. The coolant passage 31 and the refrigerant passage 41 will be described in detail later with reference to FIG. 3 and subsequent drawings.

An average value of a height of the coolant passage 31 (a length in the z direction in the drawing) is defined as hcool, and an average value of a height of the refrigerant passage 41 (a length in the z direction in the drawing) is defined as href. In this case, the average value href of the height of the refrigerant passage 41 may be smaller than the average value hcool of the height of the coolant passage 31.

Figure 4:
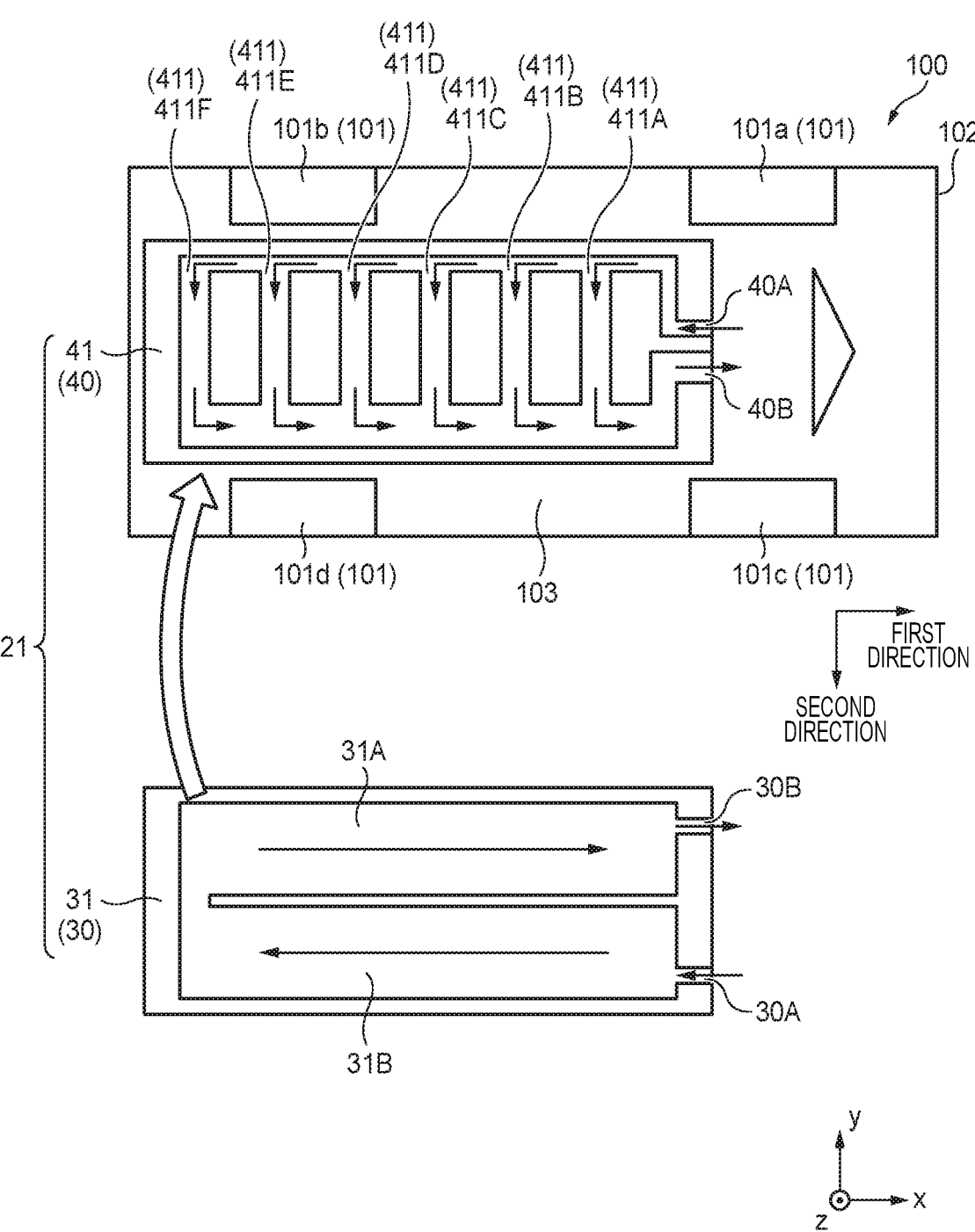
FIG. 4 is a conceptual diagram showing a mounting example in which the heat exchanger plate 21 is mounted on a vehicle 100.

FIG. 3 is an exploded perspective view showing the heat exchanger plate 21 shown in FIG. 1. FIG. 4 is a conceptual diagram showing a mounting example in which the heat exchanger plate 21 is mounted on a vehicle 100. A structure of the heat exchanger plate 21 and an example of mounting the heat exchanger plate 21 on the vehicle 100 will be described with reference to FIGS. 3 and 4.

The heat exchanger plate 21 according to the present disclosure is of a hybrid type in which the refrigerant flowing through the refrigerant layer 40 and the coolant flowing through the coolant layer 30 are used together, so that a battery temperature adjustment control can be performed in accordance with heat generation characteristics of the battery module group 10.

First, the vehicle 100 will be described with reference to FIG. 4. The vehicle 100 includes a wheel 101 and a vehicle body 102. The vehicle body 102 houses the heat exchanger plate 21. As shown in FIGS. 1 and 2, since the battery module group 10 is disposed along the first surface 22 of the heat exchanger plate 21, the vehicle body 102 also houses the battery module group 10. That is, the vehicle body 102 houses the heat exchanger plate 21 and the battery module group 10. In the example shown in the drawing, the heat exchanger plate 21 and the battery module group 10 are placed on a bottom surface 103 of the vehicle body 102. The vehicle body 102 also houses a first refrigerant circuit 5, a coolant circuit 6, a management device 7, a second refrigerant circuit 8, and the like, which will be described later with reference to FIG. 5 and subsequent drawings.

The wheel 101 may include a first wheel 101a and a second wheel 101b that are coupled to the vehicle body 102. The wheel 101 may further include a third wheel 101c and a fourth wheel 101d that are coupled to the vehicle body 102, and the vehicle 100 is typically a four-wheel automobile. Alternatively, the vehicle 100 may be a vehicle having wheels other than four wheels, such as a two-wheel motorcycle, a three-wheel automobile, or a vehicle including five or more wheels.

The vehicle body 102 couples the first wheel 101a and the second wheel 101b. An electric motor (not shown) included in the vehicle body 102 drives the first wheel 101a using electric power supplied from the battery module group 10. On the other hand, the second wheel 101b may be a steered wheel instead of a drive wheel. Alternatively, the electric motor may drive wheels other than the first wheel 101a. The number of the electric motor is not limited to one. For example, in the case of a four-wheel drive automobile or the like, a first electric motor may drive the first wheel 101a, and a second electric motor may drive the second wheel 101b.

The vehicle 100 can travel in a predetermined direction (referred to as a first direction) using the first wheel 101a and the second wheel 101b. The vehicle body 102 can constitute such a vehicle 100. A direction perpendicular to the first direction is referred to as a second direction. The second direction may be a horizontal direction of the vehicle 100. Alternatively, the second direction may not be the horizontal direction of the vehicle 100.

Next, a configuration of the heat exchanger plate 21 that can be housed in the vehicle 100 will be described with reference to FIGS. 3 and 4. The coolant layer 30 of the heat exchanger plate 21 can be disposed along the first direction described above. The refrigerant layer 40 of the heat exchanger plate 21 can be disposed along the first direction.

The heat exchanger plate 21 has a first width in the first direction. The heat exchanger plate 21 has a second width in the second direction described above. In this case, the first width may be longer than the second width. In the example shown in the drawing, the second direction is the horizontal direction of the vehicle 100, a longitudinal direction of the heat exchanger plate 21 is along the first direction, and a short-length direction of the heat exchanger plate 21 is along the second direction.

A refrigerant input portion 40A and a refrigerant output portion 40B are connected to the first refrigerant circuit 5, which will be described later with reference to FIG. 5 and subsequent drawings, or connected to the second refrigerant circuit 8, which will be described later with reference to FIG. 12 and subsequent drawings. Although the first refrigerant circuit 5 will be described later, typically, a gas-liquid two-phase refrigerant depressurized through an expansion valve enters the refrigerant layer 40 from the refrigerant input portion 40A and flows in the refrigerant layer 40. The refrigerant flowing in the refrigerant layer 40 absorbs heat received from a coolant layer or the like, is gradually gasified, and exits through the refrigerant output portion 40B. That is, in the refrigerant passage 41 provided in the refrigerant layer 40, the refrigerant flows from the refrigerant input portion 40A toward the refrigerant output portion 40B. A direction in which the refrigerant flows is indicated by arrows in FIGS. 3 and 4.

Here, the heat exchanger plate 21 has one end portion in the first direction and the other end portion opposite to the end portion. The one end portion of the heat exchanger plate 21 may be closer to a front portion of the vehicle 100 than the other end portion of the heat exchanger plate 21. The front portion of the vehicle 100 indicates a traveling direction of the vehicle 100 that is normally used. In the example shown in the drawing, an end portion of the heat exchanger plate 21 at a front side in the traveling direction of the vehicle 100 (the positive direction of the x axis) is the one end portion, and an end portion of the heat exchanger plate 21 at a rear side in the traveling direction of the vehicle 100

(the negative direction of the x axis) is the other end portion. As shown in the drawing, the one end portion of the heat exchanger plate 21 including the refrigerant input portion 40A and the refrigerant output portion 40B is disposed at a side close to the front portion of the vehicle 100. In a case where the first refrigerant circuit 5 which will be described later is disposed in a front portion of the vehicle 100, a pipe for connecting the refrigerant input portion 40A and the refrigerant output portion 40B to the first refrigerant circuit 5 can be shortened, and a set of the heat exchanger plate 21 and the first refrigerant circuit 5 disposed in a vehicle interior space can be saved in space.

On the other hand, when the first refrigerant circuit 5 is disposed in the rear portion of the vehicle 100, a positional relationship between the one end portion and the other end portion of the heat exchanger plate 21 may be reversed. That is, in this case, the one end portion of the heat exchanger plate 21 including the refrigerant input portion 40A and the refrigerant output portion 40B may be located farther from the front portion of the vehicle 100 than the other end portion.

Further, the refrigerant passage 41 includes a branch refrigerant passage 411. The branch refrigerant passage 411 is a refrigerant passage including several passages into which the refrigerant passage 41 divides. That is, there are at least two branch refrigerant passages. In the example shown in FIG. 3, the refrigerant passage 41 divides into four branch refrigerant passages including branch refrigerant passages 411A to 411D, and in the example shown in FIG. 4, the refrigerant passage 41 divides into six branch refrigerant passages including branch refrigerant passages 411A to 411F. The number of branch refrigerant passages may be three or less, five, or seven or more. Therefore, when the branch refrigerant passages 411A, 411B, 411C, 411D, and the like are respectively referred to as a first refrigerant passage, a second refrigerant passage, a third refrigerant passage, a fourth refrigerant passage, and the like, the refrigerant passage 41 has at least a first refrigerant passage and a second refrigerant passage.

Any two branch refrigerant passages can be selected from the refrigerant passage 41 having two or more (four in the example of FIG. 3 and six in the example of FIG. 4) branch refrigerant passages, and can be referred to as a first refrigerant passage and a second refrigerant passage, respectively. Here, at least a part of the first refrigerant passage is disposed closer to the one end portion in the first direction than at least a part of the second refrigerant passage.

The refrigerant flowing through the refrigerant passage 41 divides into a plurality of flows at inlets (branch portions) of the branch refrigerant passages 411A to 411D (F), and merges at outlets (coupling portions) of the branch refrigerant passages 411A to 411D (F). That is, the refrigerant passage 41 has a branch portion that divides into a first refrigerant passage (for example, the branch refrigerant passage 411A) and a second refrigerant passage (for example, the branch refrigerant passage 411B), and a coupling portion at which the first refrigerant passage and the second refrigerant passage are coupled to each other.

At least a part of the first refrigerant passage (for example, the branch refrigerant passage 411A) can be disposed along the second direction perpendicular to the first direction. At least a part of the second refrigerant passage (for example, the branch refrigerant passage 411B) can be disposed along the second direction perpendicular to the first direction. In the example shown in the drawing, the branch refrigerant passages 411A to 411D have a linear shape, and the entire the first refrigerant passage (for example, the branch refrigerant passage 411A) and the entire second refrigerant passage (for example, the branch refrigerant passage 411B) are disposed along the second direction. Alternatively, the branch refrigerant passages 411A to 411D (F) do not necessarily have a linear shape, and a part of each of the branch refrigerant passages 411A to 411D (F) may not extend in the second direction.

Next, the coolant passage 31 provided in the coolant layer 30 will be described. The coolant passage 31 has two portions, that is, a first portion 31A and a second portion 31B. The first portion 31A of the coolant passage 31 can be disposed along the first direction. The second portion 31B of the coolant passage 31 can also be disposed along the first direction. Alternatively, a coolant flowing in the first portion 31A of the coolant passage 31 and a coolant flowing in the second portion 31B of the coolant passage 31 flow in opposite directions. That is, the coolant in the first portion 31A of the coolant passage 31 flows in the first direction, and the coolant in the second portion 31B of the coolant passage 31 flows in a direction opposite to the first direction.

The heat exchanger plate 21 includes a coolant input portion 30A through which a coolant enters the coolant layer 30, and a coolant output portion 30B through which a coolant exits from the coolant layer 30. As shown in the drawing, the coolant input portion 30A and the coolant output portion 30B may be disposed at the one end portion of the heat exchanger plate 21 in the first direction. Since pipes through which a coolant flows can be collected at one place (the one end portion) by disposing the coolant input portion 30A and the coolant output portion 30B at the one end portion, a pipe outside the heat exchanger plate 21 housed in the vehicle body 102 can be further reduced in space. In addition, it is possible to facilitate a layout of pipes in a limited space inside the vehicle 100.

A coolant entering from the coolant input portion 30A toward the coolant layer 30 flows through the second portion 31B of the coolant passage 31, then returns back, flows through the first portion 31A of the coolant passage 31, and exits from the coolant output portion 30B. The coolant input portion 30A and the coolant output portion 30B are connected to the coolant circuit 6 which will be described later with reference to FIG. 5 and subsequent drawings, and a pump P provided in the coolant circuit 6 causes the coolant to flow.

A coolant flows along a longitudinal direction (the positive direction and the negative direction of the x axis) of the coolant passage 31. Examples of a direction in which the coolant flows are indicated by arrows in FIGS. 3 and 4.

In the configuration shown in FIGS. 3 and 4, the branch refrigerant passage 411 of the refrigerant passage 41 is disposed along a longitudinal direction (the first width direction described above) of the heat exchanger plate 21. The coolant in the coolant passage 31 flows along the longitudinal direction (the first width direction) of the heat exchanger plate 21. With such a configuration, a temperature variation can be reduced as will be described below. The plurality of battery modules 11 included in the battery module group 10 are arranged side by side as shown in FIG. 1, and there is a tendency that heat is likely to be accumulated in a battery module located in a central portion of the battery module group 10. Therefore, the heat accumulated in the central portion of the battery module group 10 is released in the longitudinal direction by causing the coolant to flow in the longitudinal direction of the heat exchanger plate 21, so that a temperature variation can be reduced. The branch refrigerant passage 411 is configured so as to be disposed along the longitudinal direction (the first width direction) of the heat exchanger plate 21, so that a length (corresponding to the second width described above) of each of the branch refrigerant passages 411A to 411D (F) can be further shortened. Therefore, a pressure loss of a refrigerant can be reduced, and a temperature variation can be reduced.

At least a part of the branch refrigerant passages 411A to 411D (F) may be disposed along the second direction perpendicular to the first direction. Therefore, a refrigerant in at least a part of the branch refrigerant passages 411A to 411D (F) flows along the second direction perpendicular to the first direction. On the other hand, a coolant in the coolant passage 31 flows in the first direction or a direction opposite to the first direction. In a portion where the coolant layer 30 and the refrigerant layer 40 overlap each other, a direction in which a refrigerant flows and a direction in which a coolant flows are substantially perpendicular to each other. With this configuration, a temperature variation of the refrigerant is actively reduced by the coolant.

Figure 5:
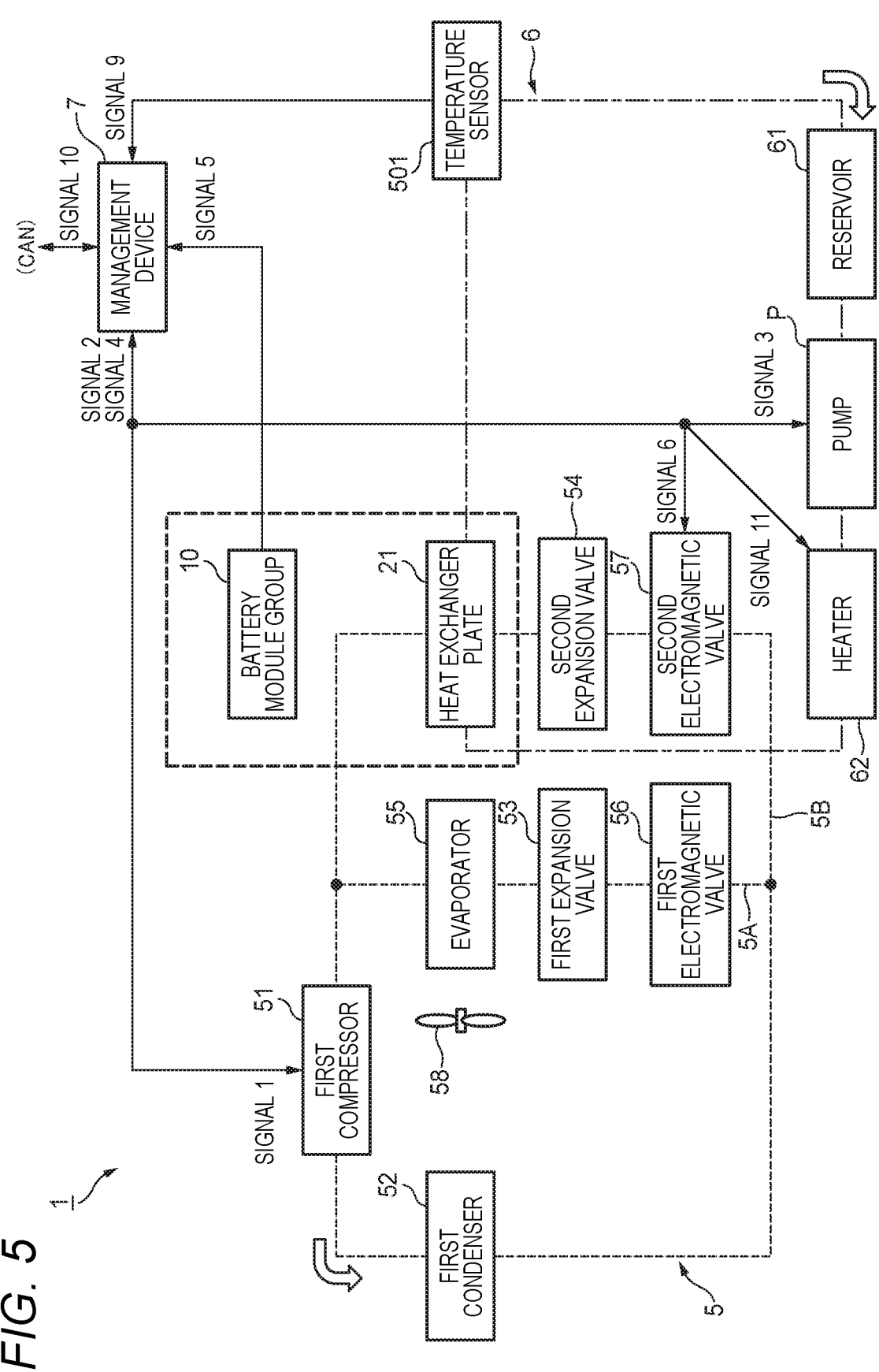
FIG. 5 is a circuit diagram showing a battery temperature adjustment system 1 including the heat exchanger plate 21 according to a first embodiment of the present disclosure.

FIG. 5 is a circuit diagram showing a battery temperature adjustment system 1 including the heat exchanger plate 21 according to the first embodiment of the present disclosure.

The battery temperature adjustment system 1 includes the first refrigerant circuit 5, the coolant circuit 6, and the management device 7. The battery temperature adjustment system 1 further includes the heat exchanger plate 21 and the battery module group 10. The heat exchanger plate 21 and the battery module group 10 may be housed in a housing or the like to form a battery pack (see FIG. 16).

The first refrigerant circuit 5 includes a first compressor 51 and a first condenser 52. The first refrigerant circuit 5 includes a first refrigerant path 5A and a second refrigerant path 5B through which a refrigerant flows between the first condenser 52 and the first compressor 51. The first refrigerant path 5A and the second refrigerant path 5B are arranged in parallel in the first refrigerant circuit 5. In the first refrigerant circuit 5, a refrigerant is circulated in a direction indicated by arrows in the drawing.

The first refrigerant path 5A of the first refrigerant circuit 5 includes a first expansion valve 53 and an evaporator 55. On the other hand, the second refrigerant path 5B includes a second electromagnetic valve 57 and a second expansion valve 54, and the second refrigerant path 5B is connected to the refrigerant input portion 40A and the refrigerant output portion 40B via the second expansion valve 54. The first refrigerant path 5A may further include a first electromagnetic valve 56 that is disposed between the first condenser 52 and the evaporator 55 and is disposed in the first refrigerant path 5A.

The first compressor 51, the first condenser 52, the first expansion valve 53, and the evaporator 55 may be a compressor, a condenser, an expansion valve, and an evaporator that constitute a refrigeration cycle for interior air conditioning (car air conditioner) of the vehicle 100.

The second expansion valve 54 may be a thermal expansion valve. The second expansion valve 54 may be an expansion valve constituting a refrigeration cycle for vehicle interior air conditioning (car air conditioner) of the vehicle 100. The second expansion valve 54 controls a refrigerant flowing into a battery cooling heat exchanger (the heat exchanger plate 21 or a chiller 59 to be described later).

The second expansion valve 54 may be a thermal expansion valve of a cross charge type. The second expansion valve 54 may be an electronic expansion valve integrated with the second electromagnetic valve 57. In the present specification, a matter of opening the second electromagnetic valve 57 or closing the second electromagnetic valve 57 may refer to opening or closing the electronic expansion valve integrated with the second electromagnetic valve 57.

The first electromagnetic valve 56 is an electromagnetic valve that controls an amount of a refrigerant flowing through the first refrigerant path 5A.

The second electromagnetic valve 57 is a valve that switches to whether to supply a refrigerant to the battery cooling heat exchanger (the heat exchanger plate 21 or the chiller 59 to be described later). The second electromagnetic valve 57 may be installed in the second expansion valve 54 or a pipe.

The heat exchanger plate 21 (the refrigerant passage 41 of the heat exchanger plate 21) is connected downstream of the second expansion valve 54, and the battery module group 10 is mounted on the heat exchanger plate 21. A sensor (not shown) is attached to the battery module group 10, and examples of the sensor include a battery temperature sensor, a current sensor, and a voltage sensor. When the sensor is a temperature sensor, the sensor may be installed in a cell body or a bus bar in the battery module 11.

The coolant circuit 6 includes a reservoir 61 and the pump P, and a coolant is circulated in a direction indicated by arrows in the drawing. The coolant circuit 6 is connected to the coolant input portion 30A and the coolant output portion 30B (see FIG. 3). For example, the coolant circuit 6 may include a heater 62 at a position downstream of the pump P.

The reservoir 61 and the pump P may be a water storage tank and a water pump that constitute a coolant cycle of the coolant circuit 6. The heater 62 heats a coolant flowing through the coolant circuit 6.

The management device 7 manages the battery module group 10. The management device 7 may be a unit (BMU) that manages a battery. Typically, the management device 7 may be implemented as an ECU. Alternatively, a CPU or other information processing devices may be used as the management device 7.

The management device 7 manages various components provided in the battery temperature adjustment system 1. Signals 1 to 11 shown in FIG. 5 indicate communication lines between the management device 7 and respective components.

For example, the management device 7 transmits a signal indicating an operation speed to the first compressor 51 (the signal 1 which is a compressor drive signal). The management device 7 acquires a signal indicating an operation status from the first compressor 51 (the signal 2 returned from an inverter of the compressor).

The management device 7 transmits a signal indicating an operation speed to the pump P (the signal 3 which is a water pump drive signal). The management device 7 acquires a signal indicating an operation status from the pump P (the signal 4).

The management device 7 acquires a signal indicating the temperature of the battery module 11 from the battery module group 10 (the signal 5 which is a temperature value indicated by a temperature sensor of a battery cell).

The management device 7 transmits a signal indicating opening and closing of a valve to the second electromagnetic valve 57 (the signal 6).

The management device 7 acquires a signal indicating the temperature of a coolant from the temperature sensor 501 of the coolant circuit 6 (the signal 9). The temperature sensor 501 is disposed between the heat exchanger plate 21 and the reservoir 61 in the coolant circuit 6. The temperature sensor 501 is not limited to thereto, and may be installed in another place in the coolant circuit 6.

The management device 7 performs various types of information communication in the vehicle 100 via a CAN (the signal 10).

The management device 7 transmits information indicating an output to the heater 62 (the signal 11 which is a heater output signal).

Here, the first electromagnetic valve 56, a blower 58, and the like, which will be described later, may be managed by a processing unit (not shown) provided at the vehicle interior air conditioning (car air conditioner) side of the vehicle 100. The management device 7 may manage the first electromagnetic valve 56, the blower 58, and the like.

(Flow Rate Control of Coolant)

Figure 6:
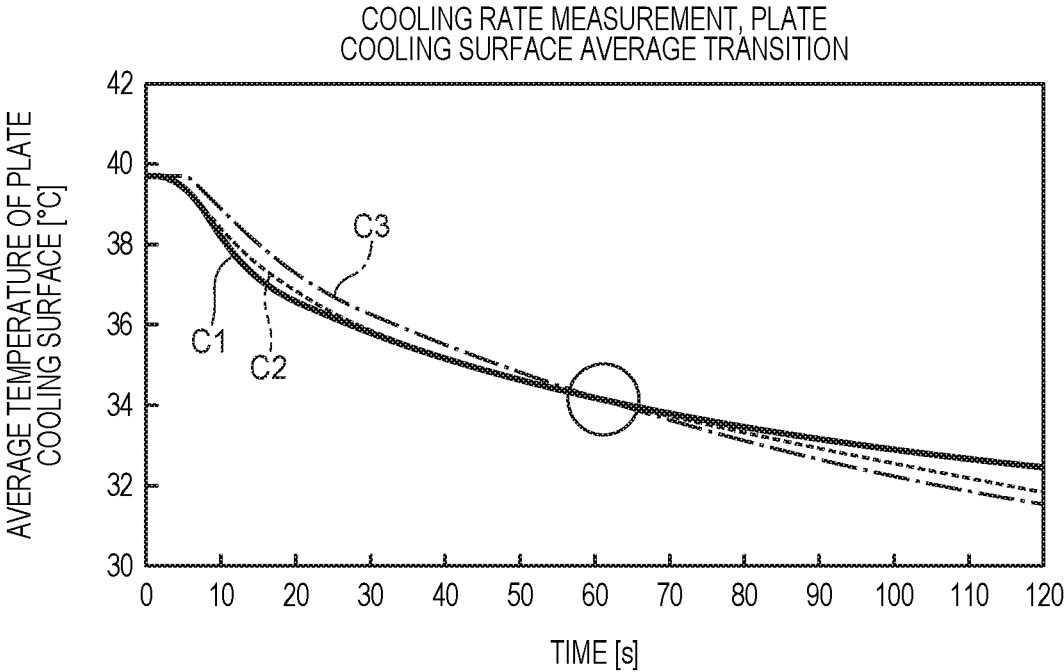
FIG. 6 is a table showing experimental results obtained by measuring a cooling rate of the heat exchanger plate 21 using both a refrigerant and a coolant.

FIG. 6 is a table showing experimental results obtained by measuring a cooling rate of the heat exchanger plate 21 using both a refrigerant and a coolant. A horizontal axis in FIG. 6 represents a time from the start of cooling by the heat exchanger plate 21. A vertical axis in FIG. 6 represents an average temperature of the first surface 22 (a plate cooling surface) of the heat exchanger plate 21. In the table shown in FIG. 6, three curves C1, C2, and C3 are drawn and the curves C1, C2, and C3 respectively indicate cases where a flow rate of a coolant flowing through the coolant layer 30 in the heat exchanger plate 21 is 0 liter/hour, 90 liter/hour, and 150 liter/hour.

As can be seen from the table in FIG. 6, before a predetermined time (in the example shown in FIG. 6, about 60 seconds after the start of cooling by the heat exchanger plate 21), a decreasing speed of the average temperature of the plate cooling surface is faster in the order of the curves C1, C2, and C3. On the other hand, after a predetermined time (in the example shown in FIG. 6, about 60 seconds after the start of cooling by the heat exchanger plate 21), the order is reversed, and the decreasing speed of the average temperature of the plate cooling surface is faster in the order of the curves C3, C2, and C1.

Here, the heat exchanger plate 21 is a plate that cools the battery module group 10 using both a refrigerant and a coolant. Therefore, as can be seen from the table shown in FIG. 6, at the start of cooling by the heat exchanger plate 21, a cooling rate of the heat exchanger plate 21 increases by preventing a circulation flow rate of a coolant in an initial stage until a refrigeration cycle is formed in the first refrigerant circuit 5 and the temperature of a refrigerant decreases. On the other hand, as can be seen from the table shown in FIG. 6, when the circulation flow rate of the coolant is kept low, the coolant that exchanged heat with the refrigerant whose temperature is decreased does not flow to the entire heat exchanger plate 21, and thus cooling performance of the battery module group 10 cooled by the heat exchanger plate 21 deteriorates.

Therefore, the inventors of the present application have found that the management device 7 controls the pump P to variably control the flow rate of the coolant flowing through the coolant layer 30, so that the heat exchanger plate 21 can achieve fastest rising of a cooling operation, and optimum cooling performance can be exhibited.

Therefore, in the present disclosure, the management device 7 controls the flow rate of the coolant such that the flow rate of the coolant flowing through the coolant layer 30 of the heat exchanger plate 21 changes in accordance with an elapsed time from the start of cooling. As a result, the cooling performance of the heat exchanger plate 21 is optimized.

For example, the management device 7 may control the flow rate of the coolant such that the flow rate of the coolant flowing through the coolant layer 30 at a first time is smaller than the flow rate of the coolant flowing through the coolant layer 30 at a second time. Here, the first time is a time before a predetermined elapsed time (60 seconds in the example shown in FIG. 6) elapses from the start of cooling, and the second time is a time after a predetermined elapsed time (60 seconds in the example shown in FIG. 6) elapses from the start of cooling.

When a cooling load of the battery module group 10 is low, it is considered that sufficient cooling can be performed without optimizing the cooling performance as described above. Therefore, when a value indicating the magnitude of the cooling load of the battery module group 10 by the heat exchanger plate 21 is larger than a predetermined value, the management device 7 may control the flow rate of the coolant such that the flow rate of the coolant flowing through the coolant layer 30 at the first time is smaller than the flow rate of the coolant flowing through the coolant layer 30 at the second time. Here, the first time is a time before a predetermined elapsed time (60 seconds in the example shown in FIG. 6) elapses from the start of cooling, and the second time is a time after a predetermined elapsed time (60 seconds in the example shown in FIG. 6) elapses from the start of cooling.

Various values can be used as the value indicating the magnitude of the cooling load of the battery module group 10. The value indicating the magnitude of the cooling load of the battery module group 10 may be, for example, an average temperature of the battery modules 11 included in the battery module group 10, an output value $\beta$ of the first compressor 51, or the like.

Figure 7:
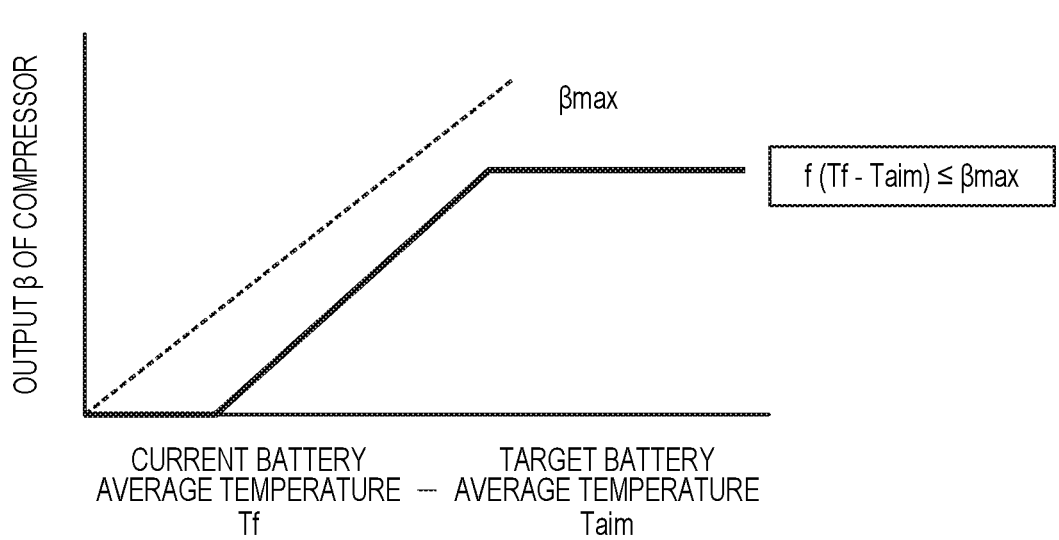
FIG. 7 is a graph showing a function f (Tf–Taim) for determining a value of an output value β of a first compressor 51.

The output value $\beta$ of the first compressor 51 may be a value determined according to a difference between the average temperature of the battery modules 11 included in the battery module group 10 and a target value of the average temperature of the battery modules 11 included in the battery module group 10. FIG. 7 is a graph showing a function f (Tf–Taim) for determining the value of the output value $\beta$ of the first compressor 51. Here, Tf is a current average temperature of the battery modules 11 included in the battery module group 10. Taim is a target value of the average temperature of the battery modules 11 included in the battery module group 10 (a target temperature to be reached as a result of cooling by the heat exchanger plate 21). A horizontal axis of the graph shown in FIG. 7 represents a difference between Tf and Taim. A vertical axis of the graph shown in FIG. 7 represents a value of the function f (Tf–Taim) for determining the output value $\beta$ of the first compressor 51. As shown in the graph of FIG. 7, the output value $\beta$ of the first compressor 51 increases as the difference between the average temperature Tf of the battery modules 11 included in the battery module group 10 and the target value Taim of the average temperature of the battery modules 11 included in the battery module group 10 increases. As shown in the graph of FIG. 7, the output value $\beta$ of the first compressor 51 increases upward to the right, and may have a maximum value $\beta$max which is a constant value from a certain time point.

Figure 8:
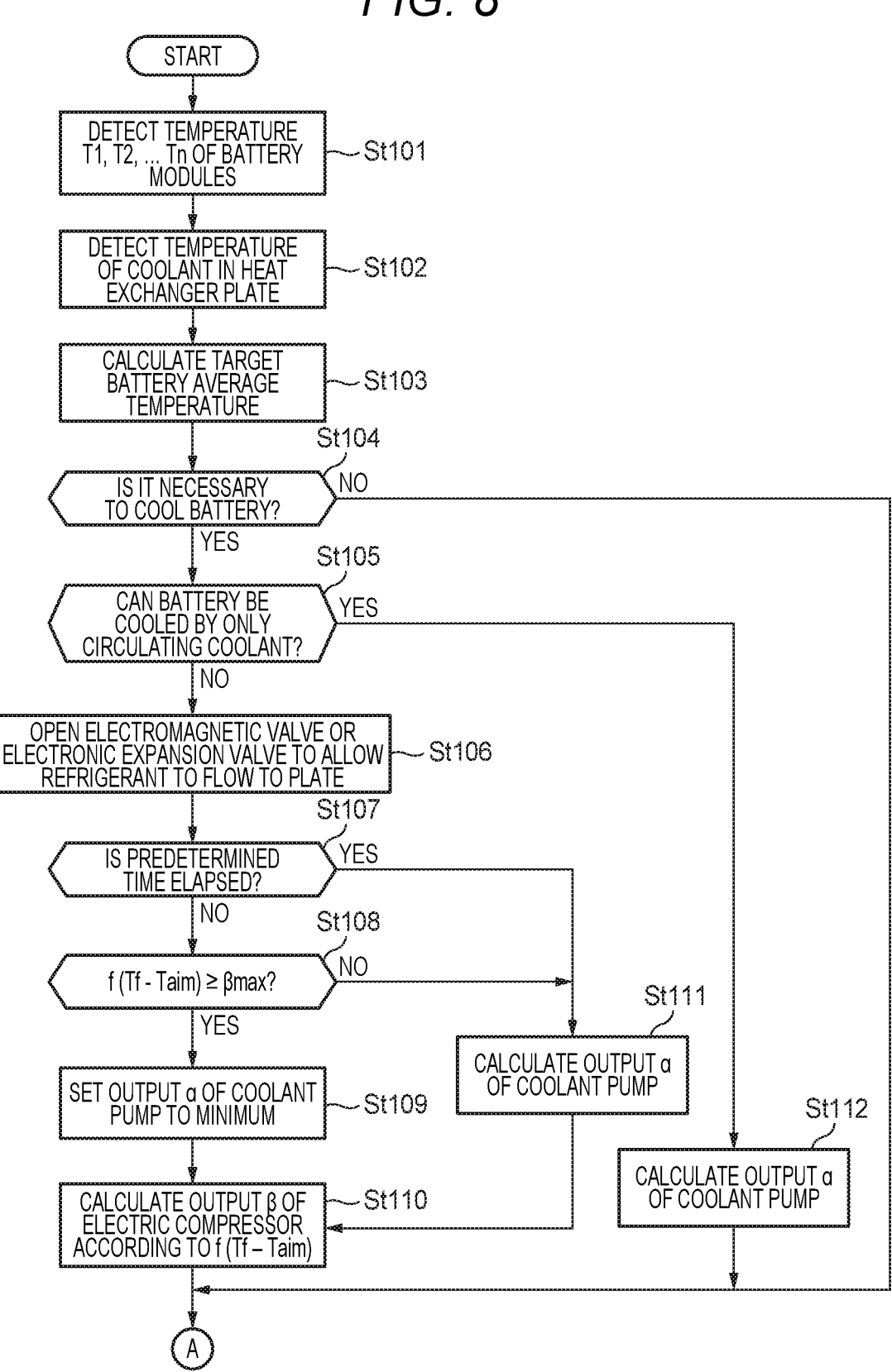
FIG. 8 is a flowchart showing an example of a flow rate control of a coolant executed by the battery temperature adjustment system 1 according to the present disclosure.

FIG. 8 is a flowchart showing an example of a flow rate control of a coolant by the battery temperature adjustment system 1 according to the present disclosure. The management device 7 detects the temperature of each battery module 11 included in the battery module group 10 (St101). This detection can be performed by the management device 7 receiving a signal (the signal 5) from a temperature sensor attached to the battery modules 11. The management device

7 may calculate the current average temperature Tf of the battery modules 11 based on the temperature of each battery module 11.

The management device 7 receives a signal (the signal 9) from the coolant circuit 6 and detects the temperature of a coolant in the heat exchanger plate 21 (St102).

The management device 7 refers to the acquired average temperature of the battery modules 11, and determines a target average temperature for the battery modules 11 (St103).

The management device 7 determines whether it is necessary to cool the battery modules 11 (St104). As a determination criterion, for example, the management device 7 may determine that it is necessary to cool the battery modules 11 when the current average temperature Tf of the battery modules 11 exceeds a predetermined set value. In addition, the management device 7 may determine that it is necessary to cool the battery module 11 when it is predicted that the temperature of the battery modules 11 is about to increase due to factors such as rapid charging of the battery modules 11, rapid acceleration of the vehicle 100, and the like.

When the management device 7 determines that it is necessary to cool the battery module 11 (St104: Yes), the management device 7 determines whether the battery modules 11 can be cooled by only circulating a coolant in the coolant circuit 6 (St105). As a determination criterion, for example, the management device 7 may determine that the battery modules 11 can be cooled by only circulating the coolant in the coolant circuit 6 when the temperature of the coolant (St102) is lower than a predetermined temperature (the current average temperature Tf of the battery modules 11–the temperature of the coolant>x° C., or the like). In addition, the management device 7 may determine that the battery modules 11 can be cooled by only circulating the coolant in the coolant circuit 6 when it is predicted that the temperature of the battery modules 11 does not rise due to the following factors, for example, the battery module 11 is not rapidly charged and the vehicle 100 is not rapidly accelerated.

When it is determined that the battery module 11 can be cooled by only circulating the coolant in the coolant circuit 6 (St105: YES), an output value $\alpha$ of the pump P that circulates the coolant in the coolant circuit 6 is calculated (St112). Then, the management device 7 controls an output of the pump P based on the calculated output value $\alpha$ (the signal 3). The calculation of the output value $\alpha$ will be described later.

When it is determined that the battery modules 11 cannot be cooled by only circulating the coolant in the coolant circuit 6 (St105: NO), the management device 7 opens the second electromagnetic valve 57 or the electronic second expansion valve 54 (St106) (the signal 6). As a result, a refrigerant in the first refrigerant circuit 5 flows into the heat exchanger plate 21, and the heat exchanger plate 21 can be cooled.

Next, the management device 7 determines whether a predetermined time elapses after the second electromagnetic valve 57 or the electronic second expansion valve 54 is opened (St107). When the predetermined time elapses (St107: YES), the management device 7 calculates the output value $\alpha$ of the pump P that circulates the coolant in the coolant circuit 6. Then, the management device 7 controls an output of the pump P based on the calculated output value $\alpha$ (St111) (the signal 3). The calculation of the output value $\alpha$ will be described later. When the predetermined time does not elapse (St107: NO), the flow rate control proceeds to step St108.

The management device 7 calculates an output value $\beta$ of the first compressor 51, where $\beta=f$ (Tf−Taim), and compares the output value $\beta$ with the above-described maximum value $\beta$max (St108). When f (Tf−Taim)<$\beta$max (St108: NO), the flow rate control proceeds to step Still. When f (Tf−Taim) $\geq\beta$max (St108: YES), the management device 7 sets the output value $\alpha$ of the pump P that circulates the coolant in the coolant circuit 6 to a minimum value (St109). The minimum value of the output value $\alpha$ may be, for example, a value at which a flow rate of the coolant is 0 liter/hour.

The management device 7 calculates or acquires the output value $\beta$ of the first compressor 51, i.e., $\beta=f$ (Tf−Taim) (step St110). When the flow rate control proceeds to step St108, since the output value $\beta$ was calculated, the management device 7 may simply acquire the output value $\beta$. Then, the management device 7 controls the first compressor 51 so that an output value of the first compressor 51 is $\beta$ (the signal 1).

Thereafter, an oil return control (A) which will be described later with reference to FIG. 11 may be performed.

For example, the output value $\alpha$ of the pump P in steps St111 and St112 may be calculated by the management device 7 as follows. FIG. 9 are two types of graphs (a graph A and a graph B) showing a calculation logic for calculating an output value of the pump P.

The graph A is a graph for calculating an output value $\alpha1$. A horizontal axis of the graph A represents a difference between the current average temperature Tf of the battery modules 11 included in the battery module group 10 and the target value Taim of the average temperature of the battery modules 11 included in the battery module group 10 (the target temperature to be reached as a result of being cooled by the heat exchanger plate 21). A vertical axis of the graph A represents the output value $\alpha1$ of the pump P. As shown in the graph A, in the battery modules 11, the output value $\alpha1$ may be determined such that the output value $\alpha1$ of the pump P increases as the difference between the current average temperature and the target average temperature increases.

The graph B is a graph for calculating an output value $\alpha2$. A horizontal axis of the graph B represents a difference between a maximum value and a minimum value among values received from the temperature sensor attached to the battery modules 11 in the battery module group 10. A vertical axis of the graph B represents the output value $\alpha2$ of the pump P. As shown in the graph B, the output value $\alpha2$ may be determined such that the output value $\alpha2$ of the pump P increases as a temperature variation of the plurality of battery modules 11 included in the battery module group 10 increases.

Then, the management device 7 determines a larger value between the output values $\alpha1$ and $\alpha2$ calculated based on the graphs A and B as the output value $\alpha$ of the pump P.
(Temporary Cancel of Heat Exchange by Evaporator 55)

Description will be given with reference to FIG. 5 again. The first refrigerant circuit 5 included in the vehicle body 102 of the vehicle 100 can be used for vehicle interior air conditioning (car air conditioner). In a case where a request for cooling the interior of the vehicle 100 is low in vehicle air conditioning, or in a case where the battery module group 10 generates heat and battery cooling by the heat exchanger plate 21 is given the highest priority, the management device 7 may control the battery temperature adjustment system 1 so as to temporarily cancel the heat exchange by the evaporator 55. When the heat exchange with the outside by the evaporator 55 is temporarily cancelled, since a refrigerant that maintains a cooling capability flows from the first refrigerant circuit 5 into the heat exchanger plate 21, cooling performance of the heat exchanger plate 21 is improved. In order to temporarily cancel the heat exchange by the evaporator 55, the first refrigerant circuit 5 includes a heat exchange preventing mechanism that prevents a refrigerant from exchanging heat with the outside of the first refrigerant circuit 5 in the evaporator 55.

An example of the heat exchange preventing mechanism is the blower 58 used together with the evaporator 55. Normally, the management device 7 may manage the strength of air blown by the blower 58 and the presence or absence of air blowing. The management device 7 can prevent the refrigerant from exchanging heat with the outside of the first refrigerant circuit 5 in the evaporator 55 by preventing (or completely stopping) the blowing of the blower 58.

Another example of the heat exchange preventing mechanism is the first electromagnetic valve 56 that is disposed between the first condenser 52 and the evaporator 55 and disposed in the first refrigerant path 5A. The management device 7 that manages the opening and closing of the first electromagnetic valve 56 closes the first electromagnetic valve 56 to reduce an amount of the refrigerant flowing through the first refrigerant path 5A (or reduce the amount of the refrigerant to zero), thereby preventing the refrigerant from exchanging heat with the outside of the first refrigerant circuit 5 in the evaporator 55.
(Refrigerant Recovery by First Compressor 51)

When the temperature of the battery modules 11 included in the battery module group 10 is too low, battery performance cannot be exhibited. Therefore, as described above, the coolant circuit 6 includes the heater 62, and the coolant flowing through the coolant circuit 6 is heated by the heater 62 and circulates, so that the battery modules 11 can be heated through the heat exchanger plate 21.

When the battery modules 11 are heated by the coolant circulating through the coolant circuit 6, it is natural that the first refrigerant circuit 5 is not operated. This is because when the first refrigerant circuit 5 is operated, the refrigerant flows into the heat exchanger plate 21, and the refrigerant cools the coolant.

Here, since the heat exchanger plate 21 according to the present disclosure includes the refrigerant layer 40, a part of the refrigerant remains at the heat exchanger plate 21 side. For example, the refrigerant may remain in the refrigerant passage 41 or the like passing through the refrigerant layer 40 of the heat exchanger plate 21. Since the refrigerant in the refrigerant layer 40 and the coolant in the coolant layer 30 can exchange heat with each other, in a situation in which the coolant is heated by the heater 62, the refrigerant in the refrigerant layer 40 may increase a heat capacity, and a heating speed by the heater 62 may be reduced. Therefore, the first refrigerant circuit 5 is operated for a short time (for example, one minute) to recover the refrigerant remaining in the heat exchanger plate 21. Therefore, the heater 62 for heating the coolant in the coolant circuit 6 is disposed in the coolant circuit 6, and the management device 7 controls the first compressor 51 to recover the refrigerant from the refrigerant layer 40 to the first refrigerant circuit 5 when the heater 62 heats the coolant in the coolant circuit 6. That is, the management device 7 operates the first compressor 51 to suction up the refrigerant remaining in the refrigerant layer 40 in a short time. As a result, heating performance by heating the coolant using the heater 62 can be improved.

When the first refrigerant circuit 5 is operated for a long period of time, the refrigerant that has a cooling capability and flows from the first refrigerant circuit 5 into the heat exchanger plate 21 cools the coolant in the heat exchanger plate 21, which has an adverse effect. The time for operating the first refrigerant circuit 5 may be appropriately determined according to the configuration of the battery temperature adjustment system 1.

(Oil Return Control)

The first refrigerant circuit 5 included in the vehicle body 102 of the vehicle 100 can be used for vehicle interior air conditioning (car air conditioner). As shown in FIG. 6, in the battery temperature adjustment system 1 used in common with vehicle interior air conditioning, the first compressor 51 and the first condenser 52 are used in common, and the evaporator 55 and the heat exchanger plate 21 (evaporator) are arranged in parallel. Here, in order to prevent burn-in of the first compressor 51, generally, compressor oil is mixed in the refrigerant.

In particular, in an evaporator in which a refrigerant is evaporated from a liquid and is converted into a gas state, compressor oil dissolved in the liquid refrigerant is likely to accumulate. That is, as a result of the accumulation of the compressor oil in the evaporator, oil necessary for lubrication does not return to the first compressor 51, and a burn-in failure of the first compressor 51 may occur.

Therefore, in the battery temperature adjustment system 1 according to the present disclosure, a valve (the second electromagnetic valve 57 or the electronic second expansion valve 54) between the first refrigerant circuit 5 and the heat exchanger plate 21 is opened at a predetermined timing, and the first compressor 51 is rotated at a predetermined rotation speed. As a result, at least a part of the compressor oil in the heat exchanger plate 21 moves from the heat exchanger plate 21 to the first refrigerant circuit 5. The compressor oil that moved from the heat exchanger plate 21 to the first refrigerant circuit 5 returns to the first compressor 51, and the burn-in failure of the first compressor 51 can be prevented.

The predetermined timing at which the oil return control is performed may be, for example, timing when an estimated amount of the compressor oil remaining in the heat exchanger plate 21 is equal to or larger than a predetermined amount. The oil return control may be performed when there is no need to circulate the refrigerant in the heat exchanger plate 21, that is, when the temperature of the battery modules 11 included in the battery module group 10 is not high.

(Rotation Speed of First Compressor 51 During Oil Return)

FIG. 10 is a table summarizing experimental results showing a state of the compressor oil in accordance with a rotation speed of a compressor. According to experiments conducted by the inventors of the present application, the inventers have found that when the rotation speed of the first compressor 51 is low (for example, the rotation speed is 3000 rpm), both a circulation rate of the compressor oil in the battery temperature adjustment system 1 and an amount of the compressor oil remaining in the heat exchanger plate 21 are significantly lower than those at the time of a high rotation speed. This also relates to the fact that an amount of oil discharged from the first compressor 51 is originally small when the rotational speed of the first compressor 51 is low. Therefore, when the first compressor 51 is constantly operated at a low rotation speed, it is not necessary to perform the above-described oil return control. However, when it is necessary to cool the battery modules 11 such as when the temperature of the battery modules 11 included in the battery module group 10 is high, it is necessary to circulate the refrigerant by increasing the rotation speed of the first compressor 51 and cool the battery modules 11 by the heat exchanger plate 21. Therefore, in the present disclosure, the management device 7 acquires an operation history of the first compressor 51, estimates an amount of compressor oil accumulating in the heat exchanger plate 21, and performs the above-described oil return operation when necessary.

FIG. 11 is a flowchart showing an example of the oil return control. In order to cool the heat exchanger plate 21, the management device 7 detects an elapsed time (a battery cooling mode operation time) from when the first refrigerant circuit 5 starts to operate (St201). Subsequently, the management device 7 detects a rotation speed and a rotation frequency (how many times the first compressor 51 is rotated) of the first compressor 51 in the battery cooling mode (St202).

The management device 7 determines whether an oil return control can be executed (St203). Various conditions can be used as criteria for such a determination. For example, in a case where the battery temperature adjustment system 1 is used in combination with interior air conditioning (car air conditioner) of the vehicle 100, a priority order relative to a cooling request of an interior air conditioning side may be used as a determination criterion. When the priority of the oil return control is higher than the priority of the cooling request of the interior air conditioning side, the management device 7 determines that the oil return control can be executed (St203: YES).

In a case where the cooling request of the interior air conditioning side has a higher priority than the oil return control, if the cooling request of the interior air conditioning side can be satisfied even when the first compressor 51 is rotated at a predetermined low-speed rotation speed (for example, 3000 rpm or less) for the oil return control, the management device 7 determines that the oil return control can be executed (St203: YES). On the other hand, in a case where the cooling request of the interior air conditioning side has a higher priority than the oil return control, if the cooling request of the interior air conditioning side cannot be satisfied when the first compressor 51 is rotated at a predetermined low-speed rotation speed (for example, 3000 rpm) for the oil return control, the management device 7 determines that the oil return control cannot be executed (St203: NO).

In a case where it is necessary to cool the battery modules 11 included in the battery module group 10, and cooling capability for cooling the battery modules 11 is insufficient when the first compressor 51 is operated at a predetermined low-speed rotation speed (for example, 3000 rpm or less) for the oil return control, the management device 7 determines that oil return control cannot be executed (St203: NO).

When it is determined that the oil return control can be executed (St203: YES), the management device 7 determines whether the oil return control is necessary (St204). For example, the management device 7 calculates an estimated amount of the compressor oil in the heat exchanger plate 21 based on the battery cooling mode operation time (St201) that is information already been detected, a rotation speed and a rotation frequency (how many times the first compressor 51 is rotated) of the first compressor 51 in the battery cooling mode. When the estimated amount is equal to or larger than a predetermined value, the management device 7 determines that the oil return control is necessary (St204: YES).

When it is determined that the oil return control is necessary (St204: YES), the management device 7 opens a valve (the second electromagnetic valve 57 or the electronic second expansion valve 54) between the first refrigerant circuit 5 and the heat exchanger plate 21 (St205) (the signal 6). Subsequently, the management device 7 operates the first compressor 51 to rotate at a predetermined rotation speed (for example, a low rotation speed of 3000 rpm or less) (St206) (the signal 1). When the first compressor 51 is rotated at a low speed, the compressor oil remaining in the heat exchanger plate 21 is less likely to be discharged again from the first compressor 51.

The management device 7 determines whether the temperature (average temperature or the like) of the battery modules 11 included in the battery module group 10 is reduced to be lower than a predetermined temperature by circulating the refrigerant by the first compressor 51 (St207) (the signal 5). When the temperature (average temperature or the like) of the battery modules 11 is lower than the predetermined temperature (St207: YES), the oil return control proceeds to step St209.

The management device 7 determines whether a predetermined time elapses after the second electromagnetic valve 57 is opened (St208). Here, the elapse of the predetermined time is based on a time when the oil return operation is started. The elapse of the time is managed according to another flowchart (not shown). When the predetermined time elapses (St208: YES) (the signal 2), the oil return control proceeds to step St209. When the predetermined time does not elapse, the oil return control returns to step St201.

In step St209, the management device 7 resets a timer that measures the predetermined time. In addition, the management device 7 closes the second electromagnetic valve 57. As shown in FIG. 11, the flowchart ends after St209, and after the flowchart ends, the oil return control may return to the start of the flowchart in FIG. 8.

(Start Timing of Oil Return Control)

In FIG. 11, the management device 7 estimates an amount of the compressor oil in the heat exchanger plate 21, opens the second electromagnetic valve 57 (or the electronic second expansion valve 54) when the amount of the compressor oil is equal to or larger than a predetermined value, and starts the oil return control. The start timing of the oil return control does not necessarily have to be based on the estimation of the amount of the compressor oil in the heat exchanger plate 21. For example, when the vehicle 100 is stopped, the second electromagnetic valve 57 may be opened to start the oil return control. Alternatively, for example, when the vehicle 100 is stopped, when the battery modules 11 included in the battery module group 10 do not generate heat, when there is nobody in the vehicle 100, or when there is no cooling request of the interior air conditioning (car air conditioner), the oil return control may be started. Therefore, in a case where the oil return control is started when the vehicle 100 is stopped, the oil return control can be performed without being restricted by the cooling of the battery modules 11 or the cooling request of the interior air conditioning (car air conditioner). For example, the management device 7 may acquire information indicating that the vehicle 100 is stopped via the CAN (the signal 10), open the second electromagnetic valve 57, and start the oil return control. In addition, the management device 7 may acquire information indicating that there is nobody in the vehicle 100 from a human sensor (not shown) provided in the vehicle 100 via the CAN (the signal 10), open the second electromagnetic valve 57, and start the oil return control.

The oil return control may be started based on a timer control. For example, the management device 7 may mea-sure a time during which the first compressor 51 is operated at a high rotation speed (for example, 5000 rpm), and when a predetermined time elapses, the second electromagnetic valve 57 (or the electronic second expansion valve 54) may be opened to start the oil return control. Alternatively, the oil return control can be started as long as the oil return control does not violate the cooling request of the vehicle air conditioning (car air conditioner) side. As another example of the timer control, the oil return control may be started with a time lag. For example, the oil return control may be started by opening the second electromagnetic valve 57 (or the electronic second expansion valve 54) after a certain period of time elapses since an estimated amount of the compressor oil in the heat exchanger plate 21 is equal to or larger than a predetermined value (corresponding to step St204).

Even when the oil return control is started at various timings as described above, after the second electromagnetic valve 57 is opened and the oil return control is started, the management device 7 may close the second electromagnetic valve 57 when the average temperature of the battery modules 11 included in the battery module group 10 is reduced to be lower than a predetermined value (corresponding to step St207). Similarly, even when the oil return control is started at various timings, after the second electromagnetic valve 57 is opened and the oil return control is started, the management device 7 may close the second electromagnetic valve 57 after a predetermined time elapses after the second electromagnetic valve 57 is opened (corresponding to step St208).

A throttle of the second expansion valve 54 may be adjusted such that a liquid refrigerant is included in the refrigerant flowing from the second expansion valve 54 to the refrigerant input portion 40A. For example, a thermal expansion valve of a cross charge type is used as the second expansion valve 54. A temperature sensitive cylinder provided in the second expansion valve 54 is attached to the heat exchanger plate 21 in the vicinity of the refrigerant input portion 40A (referred to as a position X). The expansion valve is opened even when the temperature of a refrigerant at the position X is low and a load is low (characteristics of the thermal expansion valve of the cross charge type when the load is low). Therefore, the liquid-mixed refrigerant flows to a tip of the second expansion valve 54.

The second expansion valve 54 may be an electronic expansion valve integrated with the second electromagnetic valve 57. The management device 7 controls the throttle of the electronic expansion valve, the liquid-mixed refrigerant can flow to the tip of the second expansion valve 54.

As described above, for example, the throttle of the second expansion valve 54 can be adjusted such that a liquid refrigerant is included in the refrigerant flowing from the second expansion valve 54 to the refrigerant input portion 40A. As a result, the refrigerant flowing into the heat exchanger plate 21 is in a liquid mixed state, and compressor oil dissolved in the liquid refrigerant is less likely to accumulate in the heat exchanger plate 21.

(Configuration of Battery Temperature Adjustment System 1B According to Second Embodiment)

Figure 12:
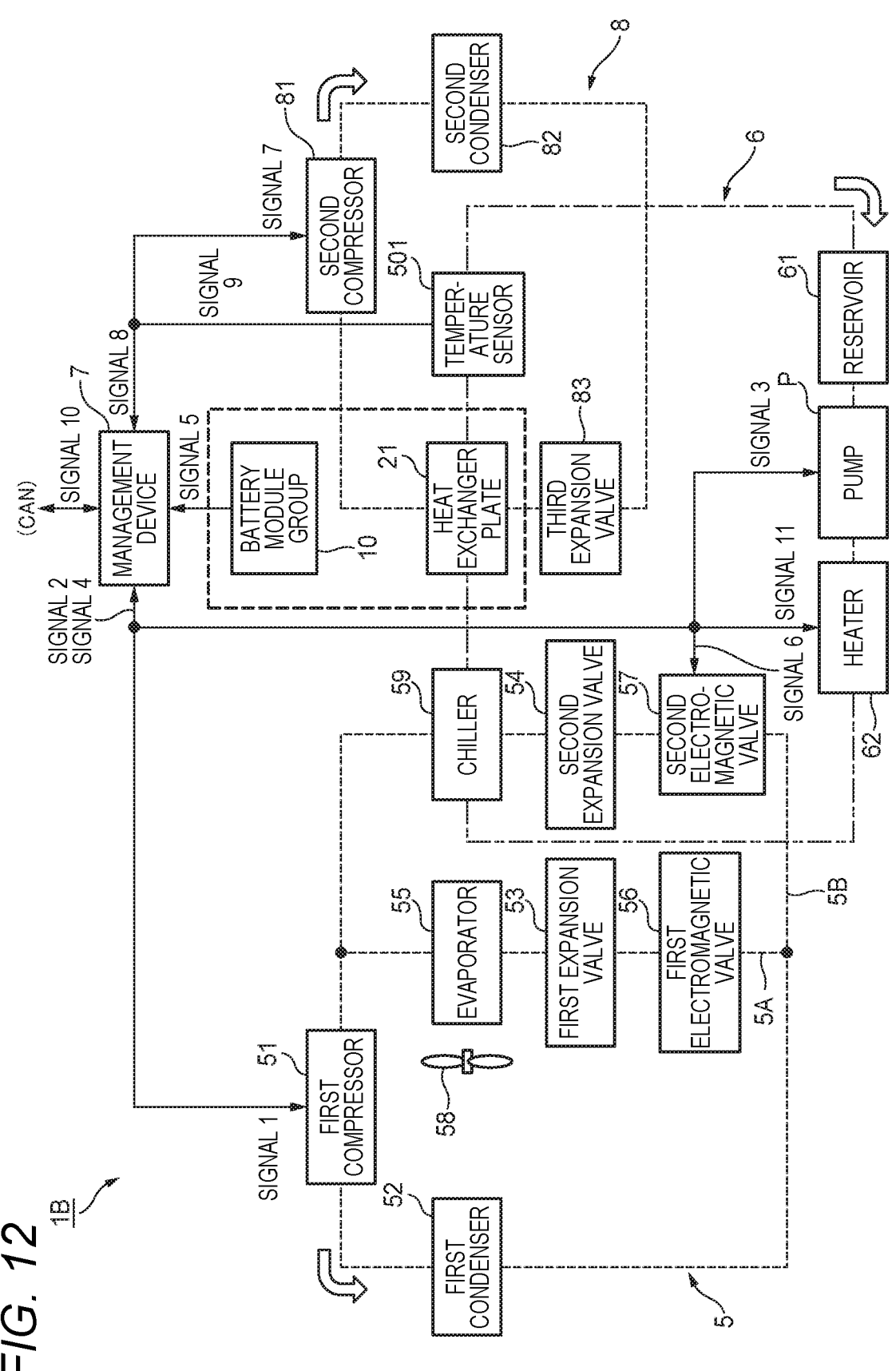
FIG. 12 is a circuit diagram showing a battery temperature adjustment system 1B including the heat exchanger plate 21 according to a second embodiment of the present disclosure.

FIG. 12 is a circuit diagram showing a battery temperature adjustment system 1B including the heat exchanger plate 21 according to a second embodiment of the present disclosure. Similar to the battery temperature adjustment system 1 according to the first embodiment shown in FIG. 6, the battery temperature adjustment system 1B according to the second embodiment includes the refrigerant circuit (first refrigerant circuit) 5, the coolant circuit 6, the heat exchanger plate 21, and the management device 7. Components of the battery temperature adjustment system 1B according to the second embodiment the same as those of the battery temperature adjustment system 1 according to the first embodiment are denoted by the same reference numerals, description thereof will be omitted, and only different portions will be described.

A major difference between the battery temperature adjustment system 1 according to the first embodiment and the battery temperature adjustment system 1B according to the second embodiment is that the battery temperature adjustment system 1B includes the second refrigerant circuit 8 in addition to the first refrigerant circuit 5.

The first refrigerant circuit 5 is a refrigerant circuit used for interior air conditioning (car air conditioner) of the vehicle 100. In the battery temperature adjustment system 1 according to the first embodiment, the heat exchanger plate 21 is disposed between the second expansion valve 54 and the first compressor 51, and the first refrigerant circuit 5 also plays a role of causing the refrigerant to flow to the heat exchanger plate 21. On the other hand, in the battery temperature adjustment system 1B according to the second embodiment, instead of the heat exchanger plate 21, the chiller 59 is disposed between the second expansion valve 54 and the first compressor 51.

The chiller 59 performs heat exchange between a coolant flowing through the coolant circuit 6 and a refrigerant flowing through the first refrigerant circuit 5. More specifically, the chiller 59 can perform heat exchange between the coolant flowing through the coolant circuit 6 and the refrigerant flowing between the second expansion valve 54 and the first compressor 51 in the first refrigerant circuit 5.

The battery temperature adjustment system 1B according to the second embodiment includes the second refrigerant circuit 8 that is provided with a second compressor 81, a second condenser 82, and a third expansion valve 83. In the second refrigerant circuit 8, a refrigerant flows in a direction indicated by arrows in the drawing. The vehicle body 102 houses the second refrigerant circuit 8. The second refrigerant circuit 8 is connected to the refrigerant input portion 40A and the refrigerant output portion 40B (see FIGS. 3 and 4).

The second compressor 81, the second condenser 82, and the third expansion valve 83 may be a compressor, a condenser, and an expansion valve that constitute a refrigeration cycle for cooling the battery modules 11.

The management device 7 manages various components provided in the battery temperature adjustment system 1B. Signals 1 to 11 shown in FIG. 12 indicate communication lines between the management device 7 and respective components. Description of the signals described in FIG. 5 in the battery temperature adjustment system 1 according to the first embodiment will not be repeated, and only different portions will be described.

The management device 7 transmits a signal indicating an operation speed to the second compressor 81 (the signal 7 which is a compressor drive signal). The management device 7 acquires a signal indicating an operation status from the second compressor 81 (the signal 8 returned from an inverter of the compressor).

In addition, the management device 7 may manage the first electromagnetic valve 56, the blower 58, and the like which will be described later.

With the above configuration, the battery temperature adjustment system 1B can combine an interior air conditioning system (the first refrigerant circuit 5) of the vehicle

100 with a heat pump system (the second refrigerant circuit 8 and the coolant circuit 6) using a refrigerant and a coolant. (Cooling Control by Second Electromagnetic Valve 57)

Here, the management device 7 controls the opening and closing of the second electromagnetic valve 57 (or the electronic second expansion valve 54, the same applies hereinafter) (the signal 6). When the management device 7 opens the second electromagnetic valve 57, an amount of a refrigerant flowing between the second expansion valve 54 and the first compressor 51 in the first refrigerant circuit 5 increases. On the contrary, when the management device 7 closes the second electromagnetic valve 57, the amount of the refrigerant flowing between the second expansion valve 54 and the first compressor 51 in the first refrigerant circuit 5 is reduced. When the management device 7 completely closes the second electromagnetic valve 57, the amount of the refrigerant flowing between the second expansion valve 54 and the first compressor 51 in the first refrigerant circuit 5 is zero. The battery temperature adjustment system 1B can be controlled as follows by opening and closing the second electromagnetic valve 57.

The heat pump system including the second refrigerant circuit 8 and the coolant circuit 6 adjusts the temperature of the battery modules 11 included in the battery module group 10. That is, the refrigerant circulating in the second refrigerant circuit 8 flows to the refrigerant layer 40 of the heat exchanger plate 21, the coolant circulating in the coolant circuit 6 flows to the coolant layer 30 of the heat exchanger plate 21, and the battery modules 11 are cooled by the refrigerant in the refrigerant layer 40 and the coolant in the coolant layer 30. The battery modules 11 can be heated by the coolant by heating the coolant using the heater 62 included in the coolant circuit 6 which will be described later.

When the vehicle 100 travels normally, the temperature adjustment of the battery modules 11 can be independently controlled by only the heat pump system including the second refrigerant circuit 8 and the coolant circuit 6. At this time, the interior air conditioning system of the vehicle 100 including the first refrigerant circuit 5 can control only the interior air conditioning without being affected by the heat pump system described above. When the management device 7 completely closes the second electromagnetic valve 57, the refrigerant does not flow to the chiller 59 disposed downstream of the second electromagnetic valve 57. As a result, heat exchange between the coolant flowing through the coolant circuit 6 and the refrigerant flowing through the first refrigerant circuit 5 is not performed in the chiller 59. Therefore, the heat pump system that includes the second refrigerant circuit 8 and the coolant circuit 6 and is used to adjust the temperature of the battery modules 11, and the interior air conditioning system of the vehicle 100 that includes the first refrigerant circuit 5 and is used to perform vehicle interior air conditioning can be separately and independently controlled. Since the first refrigerant circuit 5 has a configuration in which the first refrigerant path 5A and the second refrigerant path 5B are arranged in parallel, the refrigerant flows through the first refrigerant path 5A including the first expansion valve 53 and the evaporator 55 even when the second electromagnetic valve 57 disposed in the second refrigerant path 5B is closed.

When a cooling load of the battery modules 11 included in the battery module group 10 is high, the battery modules 11 can be cooled more strongly using both the heat pump system including the second refrigerant circuit 8 and the coolant circuit 6 and the interior air conditioning system of the vehicle 100 including the first refrigerant circuit 5.

The management device 7 opens the second electromagnetic valve 57. The management device 7 opens the second electromagnetic valve 57 and operates the pump P of the coolant circuit 6. As a result, a coolant flowing through the coolant circuit 6 and a refrigerant flowing through the first refrigerant circuit 5 flow into the chiller 59, and heat exchange is performed between the coolant flowing through the coolant circuit 6 and the refrigerant flowing through the first refrigerant circuit 5. The coolant cooled by the heat exchange in the chiller 59 is further cooled by a refrigerant flowing through the refrigerant layer 40 in the heat exchanger plate 21. That is, the coolant that is cooled twice by using the refrigerant flowing through the first refrigerant circuit 5 and the refrigerant flowing through the second refrigerant circuit 8 (and flowing inside of the heat exchanger plate 21) can more strongly cool the battery modules 11.

Examples of a case where a cooling load of the battery modules 11 included in the battery module group 10 is high include a case where the battery module group 10 is rapidly charged and a case where the average temperature of the battery modules 11 included in the battery module group 10 exceeds a predetermined value. Therefore, when the battery module group 10 is rapidly charged or when the average temperature of the battery modules 11 included in the battery module group 10 exceeds a predetermined value, the management device 7 can open the second electromagnetic valve 57 and more strongly cool the battery modules 11.

(Heating by Heater 62)

The vehicle 100 may travel in a cold district. When the temperature of the battery modules 11 included in the battery module group 10 is too low, battery performance cannot be exhibited. Therefore, the coolant circuit 6 includes the heater 62, and the heater 62 heats the coolant that flows into the heat exchanger plate 21. As a result, the heated coolant can heat the battery modules 11 through the heat exchanger plate 21.

When the coolant flowing through the coolant circuit 6 exchanges heat with the refrigerant flowing through the first refrigerant circuit 5 or the refrigerant flowing through the second refrigerant circuit 8, the coolant is cooled by the refrigerant, and thus an effect of heating the battery modules 11 using the heater 62 is not obtained. Therefore, the management device 7 controls the components included in the battery temperature adjustment system 1B to prevent the heat exchange between the refrigerant and the coolant. More specifically, the management device 7 controls the first compressor 51, the second compressor 81, the second electromagnetic valve 57, and the heater 62 such that the first compressor 51 and the second compressor 81 are stopped, the second electromagnetic valve 57 is closed, and the heater 62 heats the coolant that flows into the heat exchanger plate 21. As a result, the coolant can be heated by the heater 62 in a state in which the coolant flowing through the coolant circuit 6 is prevented from exchanging heat with the refrigerant.

Figure 13:
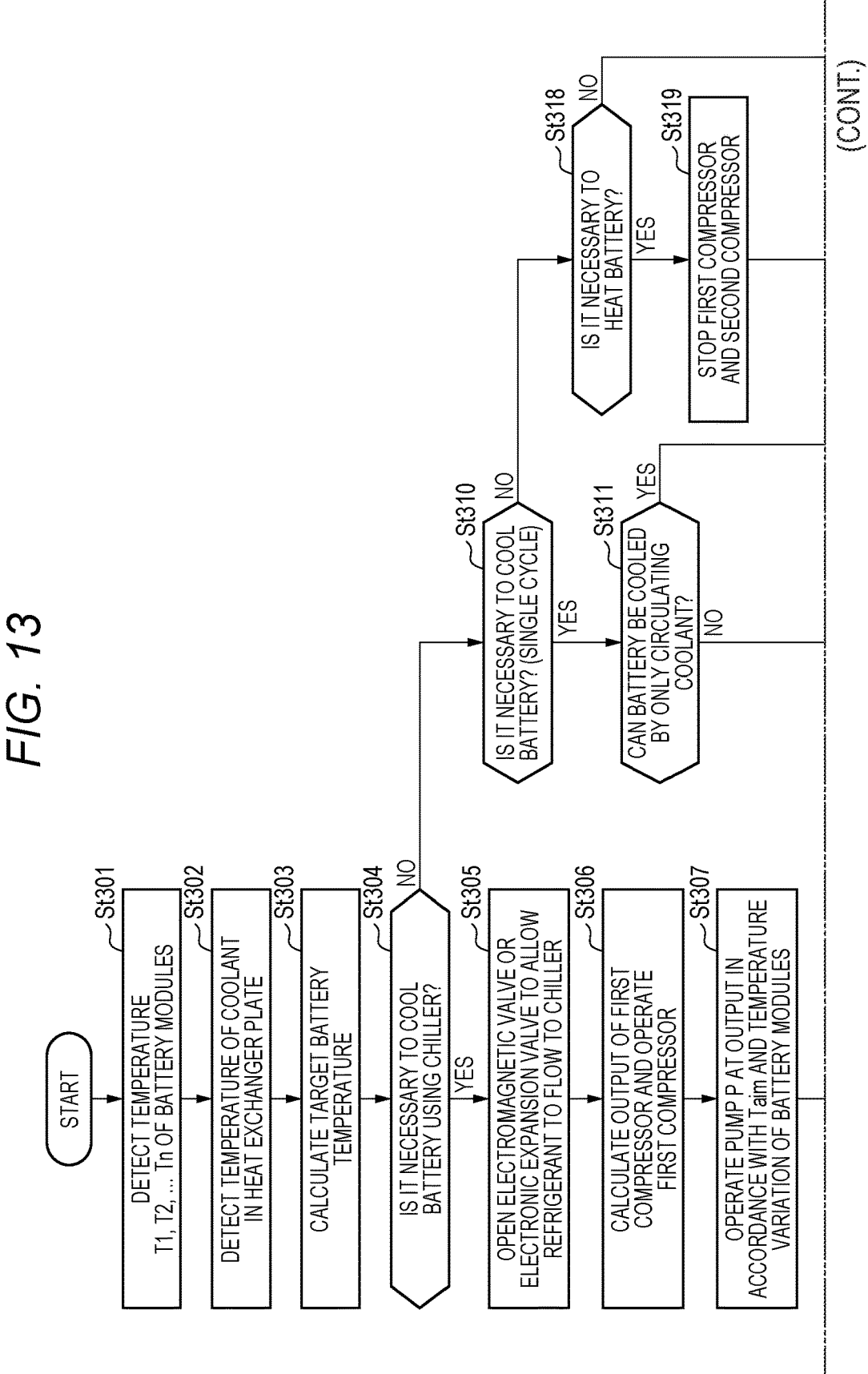
FIG. 13 is a flowchart showing an example of a flow rate control of a coolant executed by the battery temperature adjustment system 1B according to the present disclosure.

FIG. 13 is a flowchart showing an example of a flow rate control of a coolant by the battery temperature adjustment system 1B according to the present disclosure. The management device 7 detects the temperature of the battery modules 11 included in the battery module group 10 (St301). This detection can be performed by the management device 7 receiving a signal (the signal 5) from a temperature sensor attached to the battery modules 11. The management device 7 may calculate the current average temperature Tf of the battery modules 11 based on the temperature of each battery module 11.

The management device 7 receives a signal (the signal 9) from the temperature sensor 501 of the coolant circuit 6 and detects the temperature of the coolant (St302).

The management device 7 refers to the acquired temperature of the battery modules 11 (or an average temperature of the battery modules 11), and determines a target average temperature of the battery modules 11 (St303).

(Combination of First Refrigerant Circuit 5 and Second Refrigerant Circuit 8)

The management device 7 determines whether it is necessary to cool the battery using the chiller 59 (St304). As a determination criterion, for example, the management device 7 may determine that it is necessary to cool the battery modules 11 using the chiller 59 when the current average temperature Tf of the battery modules 11 exceeds a predetermined set value. In addition, the management device 7 may determine that it is necessary to cool the battery module 11 using the chiller 59 when it is predicted that the temperature of the battery modules 11 is about to increase due to factors such as rapid charging of the battery modules 11, rapid acceleration of the vehicle 100, and the like.

When the management device 7 determines that it is necessary to cool the battery using the chiller 59 (St304: YES), the management device 7 opens the second electromagnetic valve 57 (or the electronic second expansion valve 54) which is a valve between the first refrigerant circuit 5 and the heat exchanger plate 21 (St305) (the signal 6).

The management device 7 calculates an output of the first compressor 51, and operates the first compressor 51 in accordance with the output (St306) (the signal 1). When the first compressor 51 is operated, a refrigerant circulates inside the refrigerant circuit 5.

The management device 7 calculates an output of the pump P according to a value of Taim and a temperature variation of the plurality of battery modules 11 included in the battery module group 10, and operates the pump P in accordance with the output (St307).

The management device 7 opens an electromagnetic valve (not shown) that controls a flow of a refrigerant toward the heat exchanger plate 21 or opens the electronic third expansion valve 83 (St308).

The management device 7 calculates an output of the second compressor 81 according to the value of Taim, and operates the second compressor 81 in accordance with the output (St309). As shown in FIG. 13, the flowchart ends after St309, and after the flowchart ends, the flow rate control may return to the start of the flowchart in FIG. 13.

(Individual Operation of Second Refrigerant Circuit 8)

When the management device 7 determines that it is not necessary to cool the battery using the chiller 59 (St304: NO), the management device 7 determines whether it is necessary to cool the battery modules 11 (St310). As a determination criterion, for example, the management device 7 may determine that it is necessary to cool the battery modules 11 when the current average temperature Tf of the battery modules 11 exceeds a predetermined set value. Alternatively, the predetermined set value in step St310 may be a value lower than the predetermined set value in step St304. In addition, the management device 7 may determine that it is necessary to cool the battery module 11 when it is predicted that the temperature of the battery modules 11 is about to increase due to factors such as rapid charging of the battery modules 11, rapid acceleration of the vehicle 100, and the like. Alternatively, a predicted temperature rise of the battery modules 11 for determining that it is necessary to cool battery modules 11 in step St310 may be slower than a predicted temperature rise of the battery modules 11 for determining that it is necessary to cool the battery using the chiller 59 in step St304.

When the management device 7 determines that it is necessary to cool the battery modules 11 (St310: YES), the management device 7 determines whether the battery modules 11 can be cooled by only circulating a coolant in the coolant circuit 6 (St311). As a determination criterion, for example, the management device 7 may determine that the battery modules 11 can be cooled by only circulating the coolant in the coolant circuit 6 when the temperature of the coolant (acquired in St102) is lower than a predetermined temperature (the current average temperature Tf of the battery modules 11–the temperature of the coolant>x° C., or the like). In addition, the management device 7 may determine that the battery modules 11 can be cooled by only circulating the coolant of the coolant circuit 6 when it is predicted that the temperature of the battery modules 11 does not rise due to factors, for example, the battery module 11 is not rapidly charged and the vehicle 100 is not rapidly accelerated.

When it is determined that the battery module 11 can be cooled by only circulating the coolant in the coolant circuit 6 (St311: YES), the management device 7 calculates an output value α of the pump P that circulates the coolant in the coolant circuit 6 (St317). Then, the management device 7 controls an output of the pump P based on the calculated output value α (signal 3). Since the calculation of the output value α is the same as that described above with reference to FIG. 9, description thereof will be omitted.

When it is determined that the battery modules 11 cannot be cooled by only circulating the coolant in the coolant circuit 6 (St311: NO), the management device 7 determines whether a predetermined time elapses (St312). Here, the elapse of the predetermined time is based on a time when the second compressor 81 is started to operate. The elapse of the time is managed according to another flowchart (not shown). When the predetermined time elapses (St312: YES), the management device 7 calculates the output value α of the pump P that circulates the coolant in the coolant circuit 6. Then, the management device 7 controls an output of the pump P based on the calculated output value α (St316) (the signal 3). Since the calculation of the output value α is the same as that described above with reference to FIG. 9, description thereof will be omitted. When the predetermined time does not elapse (St312: NO), the flow rate control proceeds to step St313.

The management device 7 calculates an output value of the second compressor 81=f(Tf–Taim), and compares the calculated value with the above-described maximum value βmax (St313). When f(Tf–Taim)<βmax (St313: NO), the flow rate control proceeds to step St316. When f (Tf–Taim) ≥βmax (St313: YES), the management device 7 sets the output value α of the pump P that circulates the coolant in the coolant circuit 6 to a minimum value (St314). The minimum value of the output value α may be, for example, a value at which a flow rate of the coolant is 0 liter/hour.

The management device 7 calculates or acquires the output value of the second compressor 81=f(Tf–Taim) (step St315). When the flow rate control proceeds to step St313, since the output value was calculated, the management device 7 may simply acquire the output value. Then, the management device 7 controls the second compressor 81 so that an output value of the second compressor 81 is f (Tf–Taim) (the signal 7).

(Battery Heating by Heater 62)

In step St310, when the management device 7 determines that it is not necessary to cool the battery modules 11 (St310: NO), the management device 7 determines whether overheating of the battery modules 11 is necessary (St318). As a determination criterion, for example, the management device 7 may determine that overheating of the battery module 11 is necessary when the current average temperature Tf of the battery modules 11 falls below a predetermined set value.

When it is determined that heating of the battery module 11 is necessary (St318: YES), the management device 7 stops the first compressor 51 and the second compressor 81 (St319). Subsequently, the management device 7 closes the second electromagnetic valve 57 or the electronic second expansion valve 54 (St320) (the signal 6).

The management device 7 calculates the output value α of the pump P that circulates the coolant in the coolant circuit 6 based on the value of Tf–Taim. Then, the management device 7 controls an output of the pump P based on the calculated output value α (St321). Here, Tf is a current average temperature of the battery modules 11 included in the battery module group 10. Taim is a target value of the average temperature of the battery modules 11 included in the battery module group 10 (a target temperature to be reached as a result of cooling by the heat exchanger plate 21).

Then, the management device 7 determines an output value γ of the heater 62 in accordance with the value of Taim, and controls an output of the heater 62 to have the output value γ.

(Countermeasures When Heat Exchanger Plate Is Divided into a Plurality of Plates)

Figure 14B:
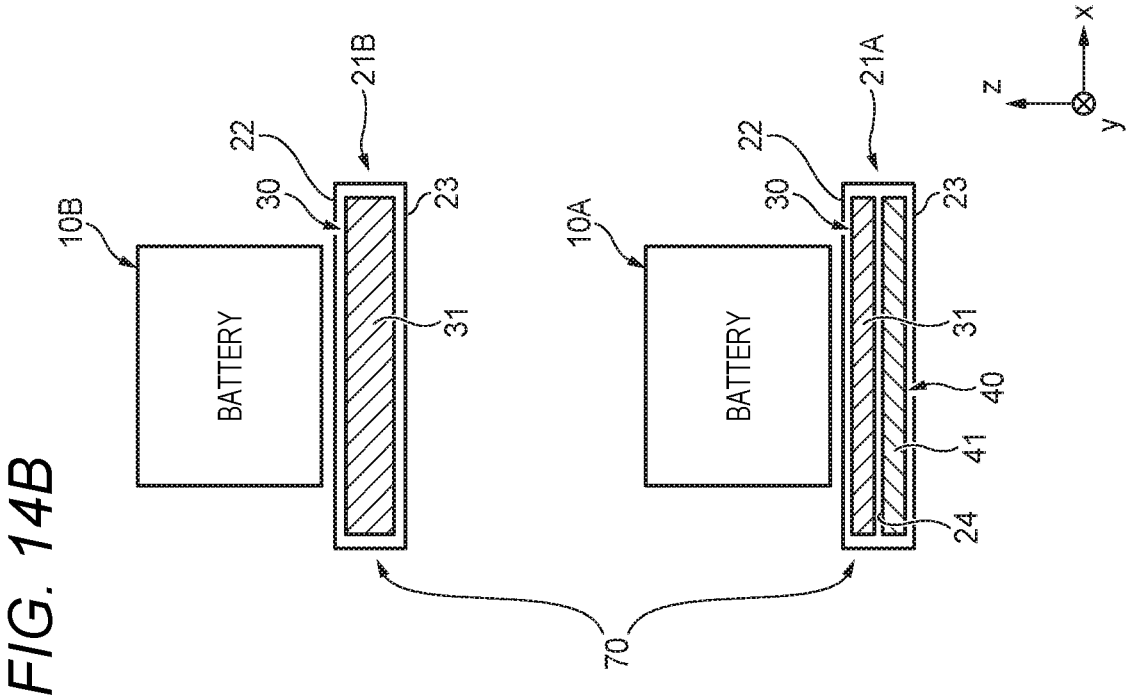
Figure 14A:
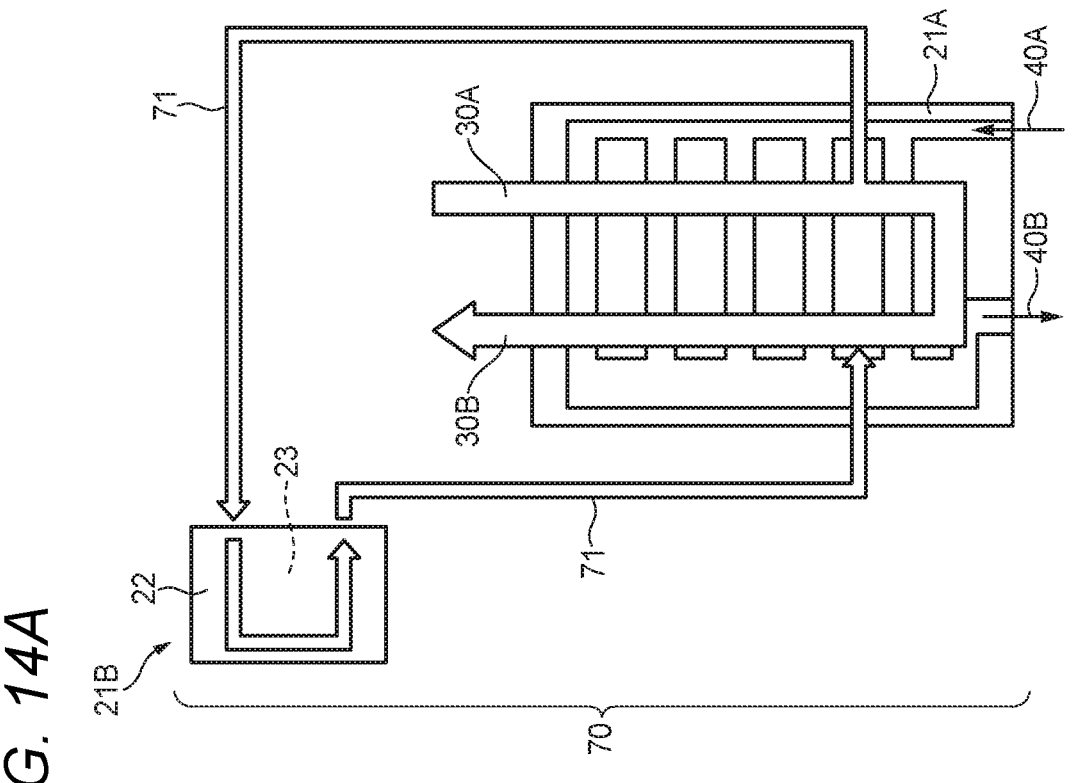

FIGS. 14A and 14B are diagrams showing a heat exchanger plate 70 according to a modification that can be used in the battery temperature adjustment system 1 or the battery temperature adjustment system 1B according to the present disclosure, in which FIG. 14A is a top view and FIG. 14B is a side cross-sectional view showing a state in which the battery module group 10 is mounted. The heat exchanger plate 70 according to the modification includes a first heat exchanger plate 21A and a second heat exchanger plate 21B.

The first heat exchanger plate 21A has the same configuration as the configuration of the heat exchanger plate 21 described with reference to FIGS. 1 to 13, and thus detailed illustration thereof will be omitted. Similar to the heat exchanger plate 21, the first heat exchanger plate 21A has the first surface 22 and the second surface 23 opposite to the first surface 22, and includes the coolant layer (first coolant layer) 30 in which a coolant flows between the first surface 22 and the second surface 23 and the refrigerant layer 40 in which a refrigerant flows between the first surface 22 and the second surface 23 (see FIGS. 1 to 3 and the like).

On the other hand, the second heat exchanger plate 21B also has the same configuration as the configuration of the heat exchanger plate 21 described with reference to FIGS. 1 to 13. The second heat exchanger plate 21B does not include the refrigerant layer 40 in which the refrigerant flows between the first surface 22 and the second surface 23. That is, the second heat exchanger plate 21B has a third surface 22 and a fourth surface 23 opposite to the third surface 22, and includes only the coolant layer (second coolant layer) 30 in which a coolant flows between the third surface 22 and the fourth surface 23. In order to avoid confusion, a surface corresponding to the first surface 22 of the first heat exchanger plate 21A is referred to as the third surface 22 for the second heat exchanger plate 21B. Similarly, a surface corresponding to the second surface 23 of the first heat exchanger plate 21A is referred to as the fourth surface 23 for the second heat exchanger plate 21B.

The technical significance of the heat exchanger plate 70 according to the modification including at least two heat exchanger plates, that is, the first heat exchanger plate 21A and the second heat exchanger plate 21B will be described. As described above, the vehicle 100 includes an electric motor that drives the first wheel 101*a* using electric power supplied from the battery module group 10. That is, the vehicle 100 travels using the electric power supplied from the battery module group 10. From the viewpoint of increasing a cruising distance of the vehicle 100, it is preferable that the number of battery cells mounted on the vehicle 100 is large. Therefore, in addition to the battery module group 10 (referred to as a battery module group 10A), a battery module group 10B is added and mounted on the vehicle 100. Each of the battery module group 10A and the battery module group 10B includes a plurality of battery modules 11.

Since each of the battery module group 10A and the battery module group 10B generates heat, cooling is required. Therefore, for example, a configuration is conceivable in which the size of the heat exchanger plate 21 described with reference to FIGS. 1 to 13 is increased, and both the battery module groups 10A and 10B are mounted on one heat exchanger plate 21.

However, an internal space of the vehicle 100 is limited. In addition, since there is unevenness or the like in a bottom portion of the vehicle, the heat exchanger plate 21 having a large size cannot be mounted on the vehicle 100.

Therefore, the heat exchanger plate 70 according to the present disclosure includes at least two heat exchanger plates 21A and 21B. The first battery module group 10A is disposed along the first surface 22 of the first heat exchanger plate 21A, and the second battery module group 10B is disposed along the third surface 22 of the second heat exchanger plate 21B. The vehicle body 102 houses the refrigerant circuit (the first refrigerant circuit 5 or the second refrigerant circuit 8), the coolant circuit 6, the first heat exchanger plate 21A, the first battery module group 10A, the second heat exchanger plate 21B, and the second battery module group 10B. The vehicle body 102 may house other components. The electric motor drives the first wheel 101*a* using electric power supplied from at least one of the first battery module group 10A and the second battery module group 10B. As a result, more battery cells can be mounted on the vehicle 100. In addition, even in a case where the heat exchanger plate 21 having a large size cannot be mounted on the vehicle 100, the first heat exchanger plate 21A and the second heat exchanger plate 21B that are divided into a plurality of pieces can be installed at different positions in the vehicle 100.

Here, a problem related to the internal space of the vehicle 100 occurs. When another coolant circuit or another refrigerant circuit is provided for each of the plurality of heat exchanger plates, the vehicle interior space is greatly reduced. On the other hand, in a case where the coolant circuit and the refrigerant circuit are shared by the plurality of heat exchanger plates, when each of the plurality of heat exchanger plates includes the refrigerant layer and the coolant layer, and refrigerant layers are connected to one another between the heat exchanger plates, and coolant layers are also connected to one another between the heat exchanger plates, the number of connection locations increases, and the vehicle interior space is also reduced.

In order to solve the above-described problem related to the reduction of the vehicle interior space, the second heat exchanger plate 21B does not include the refrigerant layer 40 in the present disclosure. The first coolant layer 30 of the first heat exchanger plate 21A and the second coolant layer 30 of the second heat exchanger plate 21B are connected to each other via a coolant layer connection passage 71. As a result, the number of connection locations where the heat exchanger plate and another component (another heat exchanger plate, a refrigerant circuit, or a coolant circuit) are connected is reduced, and the vehicle interior space is not reduced.

In addition, from the perspective of the second heat exchanger plate 21B, a normal water cooling plate (a plate that cools the battery modules 11 using a coolant) requires a chiller for dissipating heat to the outside. In the above-described configuration according to the present disclosure, the first heat exchanger plate 21A that uses both a coolant and a refrigerant can be used as a chiller for the second heat exchanger plate 21B. Therefore, a low-temperature coolant can be supplied to the water cooling plate (the second heat exchanger plate 21B) through a shorter path.

Figures 15A, 15B:
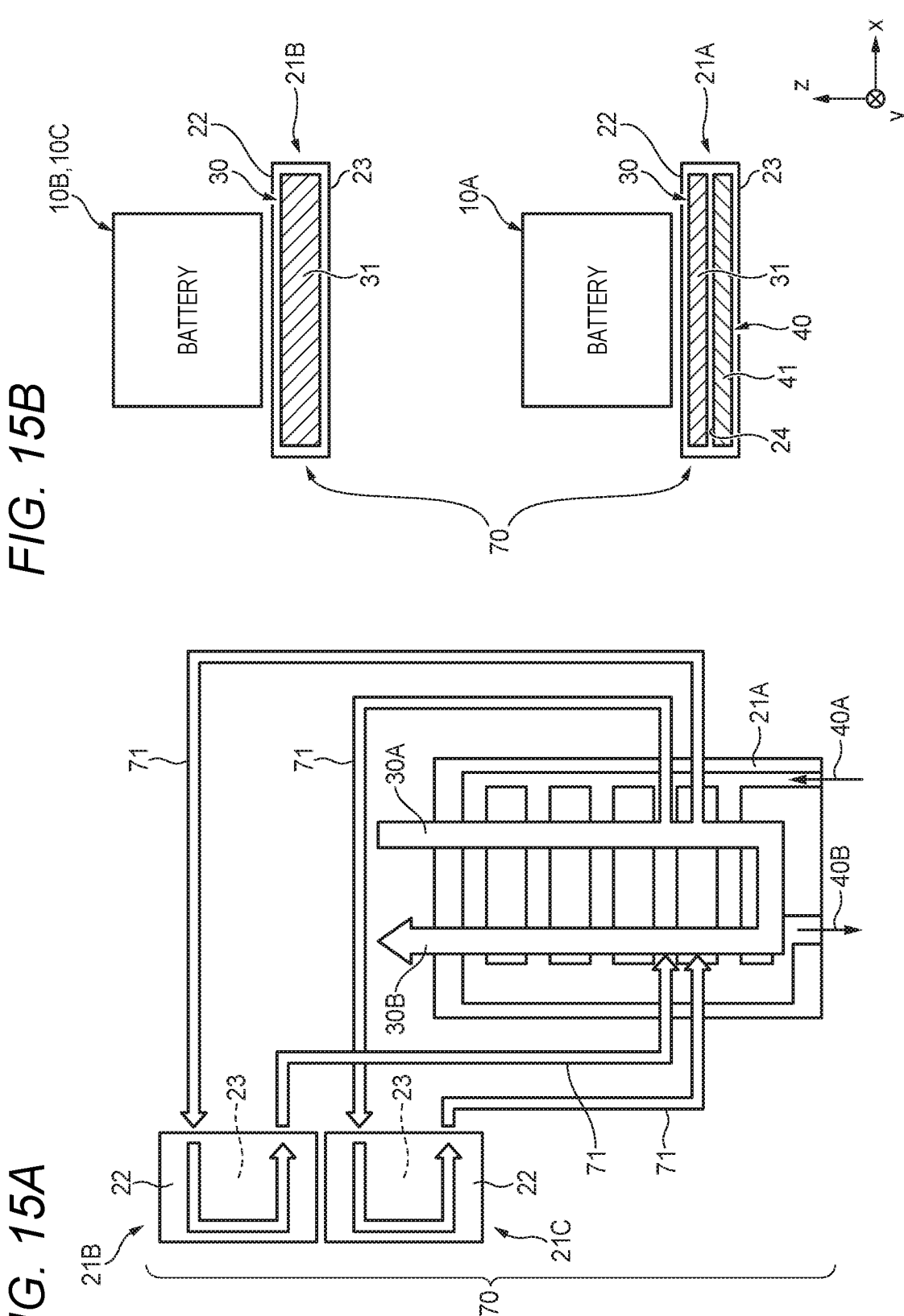

FIGS. 15A and 15B are diagrams showing the heat exchanger plate 70 according to a modification that further includes a third heat exchanger plate 21C that does not have the refrigerant layer 40, in which FIG. 15A is a top view and FIG. 15B is a side cross-sectional view showing a state in which the battery module group 10 is mounted. As shown in the drawings, the heat exchanger plate 70 may include two or more heat exchanger plates (the second heat exchanger plate 21B and the third heat exchanger plate 21C) that each include the coolant layer 30 but do not include the refrigerant layer 40.

Figure 16:
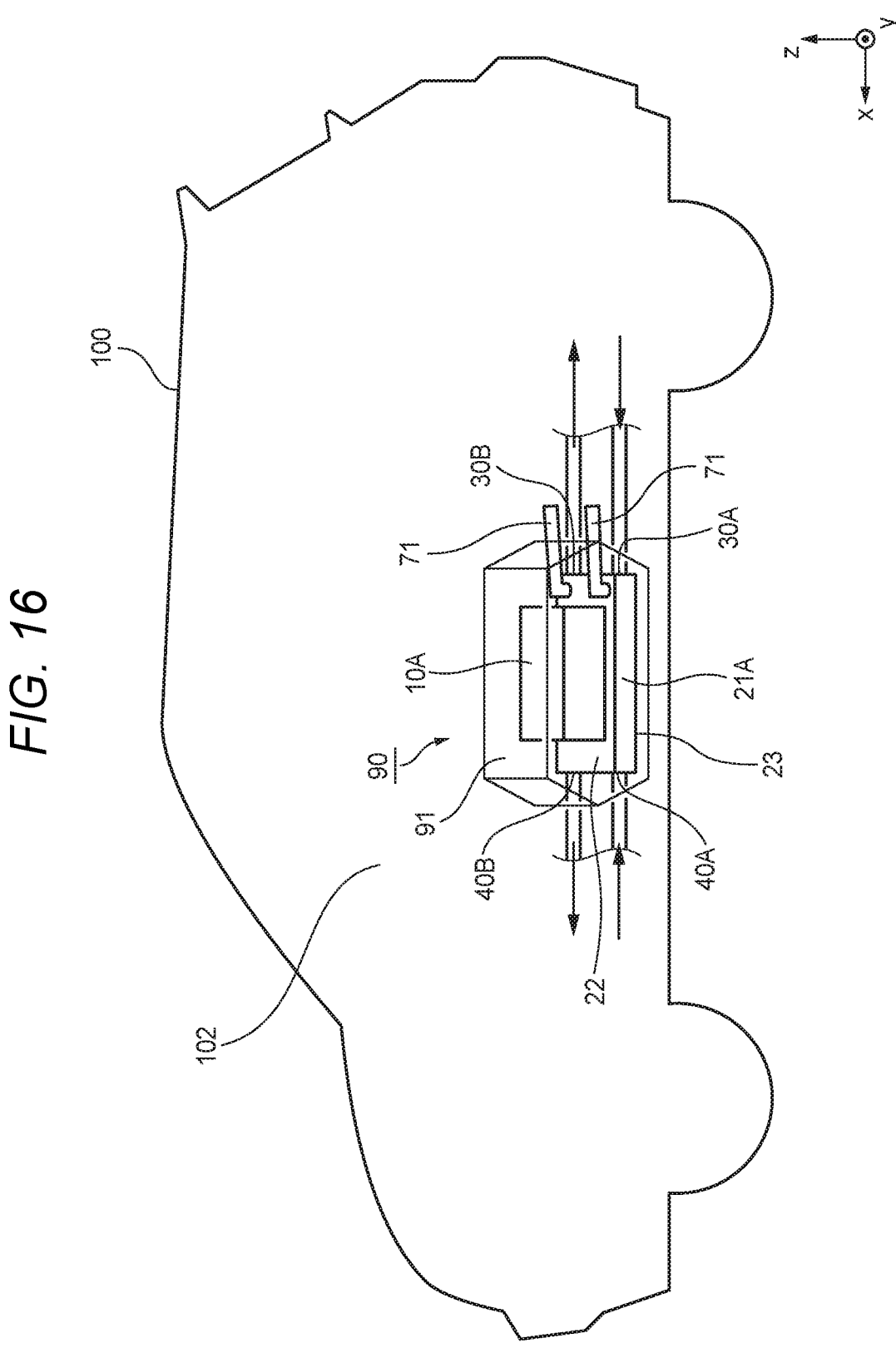
FIG. 16 is a conceptual diagram showing an example of a battery pack 90 that can be housed in a vehicle body 102.

FIG. 16 is a conceptual diagram showing an example of a battery pack 90 that can be housed in the vehicle body 102. The battery pack 90 includes a housing 91, and the first heat exchanger plate 21A and the first battery module group 10A disposed along the first surface 22 of the first heat exchanger plate 21A are provided inside the housing 91.

As shown in the drawing, pipes are provided at the coolant input portion 30A and the coolant output portion 30B of the first heat exchanger plate 21A, and the pipes can be connected to the outside of the battery pack 90. Therefore, the coolant input portion 30A and the coolant output portion 30B can be connected to the coolant circuit 6 outside the battery pack 90.

Similarly, pipes are provided at the refrigerant input portion 40A and the refrigerant output portion 40B of the first heat exchanger plate 21A, and the pipes can be connected to the outside of the battery pack 90. Therefore, the refrigerant input portion 40A and the refrigerant output portion 40B can be connected to the first refrigerant circuit 5 or the second refrigerant circuit 8 outside the battery pack 90.

Similarly, the coolant layer connection passage 71 (see FIGS. 14A and 15A) includes a pipe, and the pipe can be connected to the outside of the battery pack 90. Therefore, the first coolant layer 30 located inside the battery pack 90 and the second coolant layer 30 (not shown) located outside the battery pack 90 can be connected via the coolant layer connection passage 71.

APPENDIX

In the above description of the embodiment, the following matters are described so that those skilled in the art can implement the following matters.

(A-1) A vehicle including:

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface;

a battery module group including a plurality of battery modules, the battery module group disposed along the first surface of the heat exchanger plate;

a vehicle body that houses the heat exchanger plate and the battery module group;

a first wheel and a second wheel that are coupled to the vehicle body; and an electric motor configured to drive the first wheel using electric power supplied from the battery module group, wherein the vehicle is allowed to travel in a first direction using the first wheel and the second wheel, wherein the coolant layer is disposed along the first direction, wherein the refrigerant layer is disposed along the first direction, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the refrigerant layer includes a refrigerant passage through which the refrigerant flows from the refrigerant input portion toward the refrigerant output portion, wherein the refrigerant passage includes at least a first refrigerant passage and a second refrigerant passage, wherein the refrigerant passage further includes a branch portion that divides into the first refrigerant passage and the second refrigerant passage, and a coupling portion that couples the first refrigerant passage and the second refrigerant passage, wherein at least a part of the first refrigerant passage is disposed along a second direction perpendicular to the first direction, wherein at least a part of the second refrigerant passage is disposed along the second direction, and wherein the coolant layer includes a coolant passage through which the coolant flows, a first portion of the coolant passage is disposed along the first direction, a second portion of the coolant passage is disposed along the first direction, the coolant in the first portion flows in the first direction, and the coolant in the second portion flows in a direction opposite to the first direction.

(A-2) The vehicle according to A-1, wherein the coolant layer is disposed between the refrigerant layer and the battery module group in a portion where the coolant layer and the refrigerant layer overlap each other.

(A-3) The vehicle according to A-1, wherein the refrigerant layer is disposed between the coolant layer and the battery module group in a portion where the coolant layer and the refrigerant layer overlap each other.

(A-4) The vehicle according to any one of A-1 to A-3, wherein the coolant passage includes a coolant direction adjustment member configured to cause the coolant to flow to a corner portion of the coolant passage.

(A-5) The vehicle according to any one of A-1 to A-4, further including:

a flow path switching mechanism configured to reverse a flow of the coolant in the coolant passage.

(A-6) The vehicle according to A-5, wherein the flow path switching mechanism is configured to reverse the flow of the coolant in the coolant passage based on a rotation speed of a compressor connected to the refrigerant passage.

(A-7) The vehicle according to A-5, wherein the flow path switching mechanism is configured to reverse the flow of the coolant in the coolant passage based on a temperature of a battery included in the battery module group including the plurality of battery modules and disposed along the first surface of the heat exchanger plate.

(A-8) The vehicle according to A-5, wherein the flow path switching mechanism is configured to reverse the flow of the coolant in the coolant passage based on a value of a current flowing through a battery included in the battery module group including the plurality of battery modules and disposed along the first surface of the heat exchanger plate.

(A-9) The vehicle according to any one of A-1 to A-8, wherein a branch start point in the refrigerant passage and the refrigerant output portion are disposed on a diagonal line of the heat exchanger plate.

(A-10) The vehicle according to any one of A-1 to A-9, wherein the heat exchanger plate has a first width in the first direction and a second width in the second direction, and wherein the first width is longer than the second width.

(A-11) The vehicle according to any one of A-1 to A-10, wherein the second direction is a horizontal direction of the vehicle.

(A-12) The vehicle according to any one of A-1 to A-11, wherein the refrigerant input portion and the refrigerant output portion are disposed at one end portion of the heat exchanger plate in the first direction.

(A-13) The vehicle according to A-12, wherein the heat exchanger plate further includes a coolant input portion through which the coolant enters the coolant layer, and a coolant output portion through which the coolant exits from the coolant layer, and wherein the coolant input portion and the coolant output portion are disposed at the one end portion of the heat exchanger plate in the first direction.

(A-14) The vehicle according to A-12 or A-13, wherein the heat exchanger plate has another end portion opposite to the one end portion in the first direction, and wherein the one end portion is closer to a front portion of the vehicle than the another end portion.

(A-15) The vehicle according to any one of A-12 to A-14, wherein at least a part of the first refrigerant passage is disposed closer to the one end portion in the first direction than at least a part of the second refrigerant passage, and wherein a first cross-sectional area of the first refrigerant passage in the branch portion is smaller than a second cross-sectional area of the second refrigerant passage in the branch portion.

(A-16) The vehicle according to any one of A-12 to A-15, wherein a third cross-sectional area of at least a part of the first refrigerant passage is smaller than a fourth cross-sectional area of at least a part of the second refrigerant passage.

(A-17) A heat exchanger plate including:

a first surface;

a second surface opposite to the first surface;

a coolant layer in which a coolant flows between the first surface and the second surface; and a refrigerant layer in which a refrigerant flows between the first surface and the second surface, wherein the heat exchanger plate is allowed to be housed in a vehicle body including a battery module group, and the battery module group includes a plurality of battery modules and disposed along the first surface of the heat exchanger plate, wherein the vehicle body is allowed to form a vehicle to which a first wheel and a second wheel are coupled, the vehicle includes an electric motor configured to drive the first wheel using electric power supplied from the battery module group, and the vehicle is allowed to travel in a first direction using the first wheel and the second wheel, wherein the coolant layer is allowed to be disposed along the first direction, wherein the refrigerant layer is allowed to be disposed along the first direction, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the refrigerant layer includes a refrigerant passage through which the refrigerant flows from the refrigerant input portion toward the refrigerant output portion, wherein the refrigerant passage includes at least a first refrigerant passage and a second refrigerant passage, wherein the refrigerant passage further includes a branch portion that divides into the first refrigerant passage and the second refrigerant passage, and a coupling portion that couples the first refrigerant passage and the second refrigerant passage, wherein at least a part of the first refrigerant passage is allowed to be disposed along a second direction perpendicular to the first direction, wherein at least a part of the second refrigerant passage is allowed to be disposed along the second direction, and wherein the coolant layer includes a coolant passage through which the coolant flows, a first portion of the coolant passage is allowed to be disposed along the first direction, a second portion of the coolant passage is allowed to be disposed along the first direction, the coolant in the first portion flows in the first direction, and the coolant in the second portion flows in a direction opposite to the first direction.

(A-18) The heat exchanger plate according to A-17, wherein the coolant layer is allowed to be disposed between the refrigerant layer and the battery module group in a portion where the coolant layer and the refrigerant layer overlap each other.

(A-19) The heat exchanger plate according to A-17, wherein the refrigerant layer is allowed to be disposed between the coolant layer and the battery module group in a portion where the coolant layer and the refrigerant layer overlap each other.

(A-20) The heat exchanger plate according to any one of A-17 to A-19, wherein the coolant passage includes a coolant direction adjustment member configured to cause the coolant to flow to a corner portion of the coolant passage.

(A-21) The heat exchanger plate according to any one of A-17 to A-20, further including:

a flow path switching mechanism configured to reverse a flow of the coolant in the coolant passage.

(A-22) The heat exchanger plate according to A-21, wherein the flow path switching mechanism is configured to reverse the flow of the coolant in the coolant passage based on a rotation speed of a compressor connected to the refrigerant passage.

(A-23) The heat exchanger plate according to A-21, wherein the flow path switching mechanism is configured to reverse the flow of the coolant in the coolant passage based on a temperature of a battery included in the battery module group including the plurality of battery modules and disposed along the first surface.

(A-24) The heat exchanger plate according to A-21, wherein the flow path switching mechanism is configured to reverse the flow of the coolant in the coolant passage based on a value of a current flowing through a battery included in the battery module group including the plurality of battery modules and disposed along the first surface.

(A-25) The heat exchanger plate according to any one of A-17 to A-24, wherein a branch start point in the refrigerant passage and the refrigerant output portion are disposed on a diagonal line of the heat exchanger plate.

(A-26) The heat exchanger plate according to any one of A-17 to A-25, wherein the heat exchanger plate has a first width in the first direction and a second width in the second direction, and wherein the first width is allowed to be longer than the second width.

(A-27) The heat exchanger plate according to any one of A-17 to A-26, wherein the second direction is allowed to be a horizontal direction of the vehicle body.

(A-28) The heat exchanger plate according to any one of A-17 to A-27, wherein the refrigerant input portion and the refrigerant output portion is allowed to be disposed at one end portion of the heat exchanger plate in the first direction.

(A-29) The heat exchanger plate according to A-28, further including:

a coolant input portion through which the coolant enters the coolant layer, and a coolant output portion through which the coolant exits from the coolant layer, wherein the coolant input portion and the coolant output portion are allowed to be disposed at the one end portion in the first direction.

(A-30) The heat exchanger plate according to A-28 or A-29, further including:

another end portion opposite to the one end portion in the first direction, wherein the one end portion is allowed to be disposed closer to a front portion of the vehicle than the another end portion.

(A-31) The heat exchanger plate according to any one of A-28 to A-30, wherein at least a part of the first refrigerant passage is disposed closer to the one end portion in the first direction than at least a part of the second refrigerant passage, and wherein a first cross-sectional area of the first refrigerant passage in the branch portion is smaller than a second cross-sectional area of the second refrigerant passage in the branch portion.

(A-32) The heat exchanger plate according to any one of A-28 to A-31, wherein a third cross-sectional area of at least a part of the first refrigerant passage is smaller than a fourth cross-sectional area of at least a part of the second refrigerant passage.

(B-1) A vehicle including:

a refrigerant circuit including a compressor, a condenser, a first expansion valve, a second expansion valve, and an evaporator, the refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface;

a battery module group including a plurality of battery modules, the battery module group being disposed along the first surface of the heat exchanger plate;

a management device configured to manage the battery module group;

a vehicle body that houses the refrigerant circuit, the coolant circuit, the heat exchanger plate, the battery module group, and the management device;

a first wheel and a second wheel that are coupled to the vehicle body; and an electric motor configured to drive the first wheel using electric power supplied from the battery module group, wherein the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exits from the coolant layer, and the coolant circuit is connected to the coolant input portion and the coolant output portion, wherein the refrigerant circuit includes a first refrigerant path and a second refrigerant path, the first refrigerant path and the second refrigerant path through which the refrigerant flows between the condenser and the compressor, wherein the first refrigerant path includes the first expansion valve and the evaporator, wherein the second refrigerant path includes a second electromagnetic valve and the second expansion valve, wherein the second refrigerant path is connected to the refrigerant input portion and the refrigerant output portion, and, wherein at least a part of a compressor oil in the heat exchanger plate moves from the heat exchanger plate to the refrigerant circuit in response to the management device causing the compressor to rotate at a predetermined rotation speed and opening the second electromagnetic valve.

(B-2) The vehicle according to B-1, wherein the management device is configured to estimate an amount of the compressor oil in the heat exchanger plate, and open the second electromagnetic valve in a case in which the amount of the compressor oil is equal to or larger than a predetermined value.

(B-3) The vehicle according to B-1, wherein the management device is configured to open the second electromagnetic valve in a case in which the vehicle is stopped.

(B-4) The vehicle according to B-1, wherein the management device is configured to open the second electromagnetic valve based on a timer control.

(B-5) The vehicle according to any one of B-1 to B-4, wherein the management device is configured to close the second electromagnetic valve after a predetermined time elapses from opening of the second electromagnetic valve.

(B-6) The vehicle according to any one of B-1 to B-5, wherein the management device is configured to close the second electromagnetic valve in a case in which an average temperature of the battery modules included in the battery module group falls below a predetermined value.

(B-7) The vehicle according to any one of B-1 to B-6, wherein a throttle of the second expansion valve is adjusted such that a liquid refrigerant is included in the refrigerant flowing from the second expansion valve to the refrigerant input portion.

(B-8) The vehicle according to B-7, wherein the second expansion valve is a thermal expansion valve of a cross charge type.

(B-9) The vehicle according to B-7, wherein the second expansion valve is an electronic expansion valve integrated with the second electromagnetic valve.

(B-10) A temperature adjustment system including:

a refrigerant circuit including a compressor, a condenser, a first expansion valve, a second expansion valve, and an evaporator, the refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface;

a management device configured to manage a battery module group including a plurality of battery modules, the battery module group being disposed along the first surface of the heat exchanger plate;

wherein the temperature adjustment system is allowed to be housed in a vehicle body having the battery module group, wherein the vehicle body is allowed to form a vehicle to which a first wheel and a second wheel are coupled, the vehicle includes an electric motor configured to drive the first wheel using electric power supplied from the battery module group, and the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exists from the coolant layer, and the coolant circuit is connected to the coolant input portion and the coolant output portion, wherein the refrigerant circuit includes a first refrigerant path and a second refrigerant path, the first refrigerant path and the second refrigerant path through which the refrigerant flows between the condenser and the compressor, wherein the first refrigerant path includes the first expansion valve and the evaporator, wherein the second refrigerant path includes a second electromagnetic valve and the second expansion valve, wherein the second refrigerant path is connected to the refrigerant input portion and the refrigerant output portion, and, wherein at least a part of a compressor oil in the heat exchanger plate moves from the heat exchanger plate to the refrigerant circuit in response to the management device causing the compressor to rotate at a predetermined rotation speed and opening the second electromagnetic valve.

(B-11) The temperature adjustment system according to B-10, wherein the management device is configured to estimate an amount of the compressor oil in the heat exchanger plate, and open the second electromagnetic valve in a case in which the amount of the compressor oil is equal to or larger than a predetermined value.

(B-12) The temperature adjustment system according to B-10, wherein the management device is configured to open the second electromagnetic valve in a case in which the vehicle is stopped.

(B-13) The temperature adjustment system according to B-10, wherein the management device is configured to open the second electromagnetic valve based on a timer control.

(B-14) The temperature adjustment system according to any one B-10 to B-13, wherein the management device is configured to close the second electromagnetic valve after a predetermined time elapses from opening of the second electromagnetic valve.

(B-15) The temperature adjustment system according to any one of B-10 to B-14, wherein the management device is configured to close the second electromagnetic valve in a case in which an average temperature of the battery modules included in the battery module group falls below a predetermined value.

(B-16) The temperature adjustment system according to any one of B-10 to B-15, wherein a throttle of the second expansion valve is adjusted such that a liquid refrigerant is included in the refrigerant flowing from the second expansion valve to the refrigerant input portion.

(B-17) The temperature adjustment system according to B-16, wherein the second expansion valve is a thermal expansion valve of a cross charge type.

(B-18) The temperature adjustment system according to B-16, wherein the second expansion valve is an electronic expansion valve integrated with the second electromagnetic valve.

(C-1) A vehicle including:

a refrigerant circuit including a compressor, a condenser, a first expansion valve, a second expansion valve, and an evaporator, the refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface;

a battery module group including a plurality of battery modules, the battery module group being disposed along the first surface of the heat exchanger plate;

a management device configured to manage the battery module group;

a vehicle body that houses the refrigerant circuit, the coolant circuit, the heat exchanger plate, the battery module group, and the management device;

a first wheel and a second wheel that are coupled to the vehicle body; and an electric motor configured to drive the first wheel using electric power supplied from the battery module group, wherein the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exits from the coolant layer, and the coolant circuit is connected to the coolant input portion and the coolant output portion, wherein the refrigerant circuit includes a first refrigerant path and a second refrigerant path, the first refrigerant path and the second refrigerant path through which the refrigerant flows between the condenser and the compressor, wherein the first refrigerant path includes the first expansion valve and the evaporator, wherein the second refrigerant path includes a second electromagnetic valve and the second expansion valve, wherein the second refrigerant path is connected to the refrigerant input portion and the refrigerant output portion, and wherein the management device is configured to control a flow rate of the coolant such that a flow rate of the coolant flowing through the coolant layer of the heat exchanger plate changes in accordance with an elapsed time from a start of cooling.

(C-2) The vehicle according to C-1, wherein the management device is configured to control the flow rate of the coolant such that a flow rate of the coolant flowing through the coolant layer at a first time is lower than a flow rate of the coolant flowing through the coolant layer at a second time, wherein the first time is a time before a predetermined elapsed time elapses from the start of the cooling, and wherein the second time is a time after the predetermined elapsed time elapses from the start of the cooling.

(C-3) The vehicle according to C-1, wherein the management device is configured to control the flow rate of the coolant such that a flow rate of the coolant flowing through the coolant layer at a first time is smaller than a flow rate of the coolant flowing through the coolant layer at a second time in a case in which a value indicating a magnitude of a cooling load of the battery module group by the heat exchanger plate is larger than a predetermined value, wherein the first time is a time before a predetermined elapsed time elapses from the start of the cooling, and wherein the second time is a time after the predetermined elapsed time elapses from the start of the cooling.

(C-4) The vehicle according to C-3, wherein the value indicating the magnitude of the cooling load is an output value $\beta$ of the compressor.

(C-5) The vehicle according to C-4, wherein the output value $\beta$ of the compressor is a value determined according to a difference between an average temperature of the battery modules included in the battery module group and a target value of the average temperature of the battery modules included in the battery module group, and wherein the output value $\beta$ of the compressor increases as the difference between the average temperature of the battery modules included in the battery module group and the target value of the average temperature of the battery modules included in the battery module group increases.

(C-6) The vehicle according to any one of C-1 to C-5, wherein the refrigerant circuit includes a heat exchange preventing mechanism configured to prevent the refrigerant in the evaporator from exchanging heat with an outside of the refrigerant circuit.

(C-7) The vehicle according to C-6, wherein the heat exchange preventing mechanism is a blower, and wherein the management device is configured to reduce air blown by the blower to prevent the refrigerant in the evaporator from exchanging heat with the outside of the refrigerant circuit.

(C-8) The vehicle according to C-6, wherein the heat exchange preventing mechanism is a first electromagnetic valve disposed between the condenser and the evaporator and also in the first refrigerant path, and wherein the management device is configured to close the first electromagnetic valve to prevent the refrigerant in the evaporator from exchanging heat with the outside of the refrigerant circuit.

(C-9) The vehicle according to any one of C-1 to C-8, wherein a heater configured to heat the coolant in the coolant circuit is disposed in the coolant circuit, and wherein the management device is configured to control the compressor so as to recover the refrigerant from the refrigerant layer to the refrigerant circuit in a case in which the heater heats the coolant in the coolant circuit.

(C-10) A temperature adjustment system including:

a refrigerant circuit including a compressor, a condenser, a first expansion valve, a second expansion valve, and an evaporator, the refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface; and a management device configured to manage a battery module group including a plurality of battery modules, the battery module group being disposed along the first surface of the heat exchanger plate, wherein the temperature adjustment system is allowed to be housed in a vehicle body including the battery module group, wherein the vehicle body is allowed to form a vehicle to which a first wheel and a second wheel are coupled, the vehicle includes an electric motor configured to drive the first wheel using electric power supplied from the battery module group, and the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exits from the coolant layer, and the coolant circuit is connected to the coolant input portion and the coolant output portion, wherein the refrigerant circuit includes a first refrigerant path and a second refrigerant path, the first refrigerant path and the second refrigerant path through which the refrigerant flows between the condenser and the compressor, wherein the first refrigerant path includes the first expansion valve and the evaporator, wherein the second refrigerant path includes a second electromagnetic valve and the second expansion valve, wherein the second refrigerant path is connected to the refrigerant input portion and the refrigerant output portion, and, wherein the management device is configured to control a flow rate of the coolant such that a flow rate of the coolant flowing through the coolant layer of the heat exchanger plate changes in accordance with an elapsed time from a start of cooling.

(C-11) The temperature adjustment system according to C-10, wherein the management device is configured to control the flow rate of the coolant such that a flow rate of the coolant flowing through the coolant layer at a first time is lower than a flow rate of the coolant flowing through the coolant layer at a second time, wherein the first time is a time before a predetermined elapsed time elapses from the start of the cooling, and wherein the second time is a time after the predetermined elapsed time elapses from the start of the cooling.

(C-12) The temperature adjustment system according to C-10, wherein the management device is configured to control the flow rate of the coolant such that a flow rate of the coolant flowing through the coolant layer at a first time is smaller than a flow rate of the coolant flowing through the coolant layer at a second time in a case in which a value indicating a magnitude of a cooling load of the battery module group by the heat exchanger plate is larger than a predetermined value, wherein the first time is a time before a predetermined elapsed time elapses from the start of the cooling, and wherein the second time is a time after the predetermined elapsed time elapses from the start of the cooling.

(C-13) The temperature adjustment system according to C-12, wherein the value indicating the magnitude of the cooling load is an output value β of the compressor.

(C-14) The temperature adjustment system according to C-13, wherein the output value β of the compressor is a value determined according to a difference between an average temperature of the battery modules included in the battery module group and a target value of the average temperature of the battery modules included in the battery module group, and wherein the output value β of the compressor increases as the difference between the average temperature of the battery modules included in the battery module group and the target value of the average temperature of the battery modules included in the battery module group increases.

(C-15) The temperature adjustment system according to any one of C-10 to C-14, wherein the refrigerant circuit includes a heat exchange preventing mechanism configured to prevent the refrigerant in the evaporator from exchanging heat with an outside of the refrigerant circuit.

(C-16) The temperature adjustment system according to C-15, wherein the heat exchange preventing mechanism is a blower, and wherein the management device is configured to reduce air blown by the blower to prevent the refrigerant in the evaporator from exchanging heat with the outside of the refrigerant circuit in the evaporator.

(C-17) The temperature adjustment system according to C-15, wherein the heat exchange preventing mechanism is a first electromagnetic valve disposed between the condenser and the evaporator and also in the first refrigerant path, and wherein the management device is configured to close the first electromagnetic valve to prevent the refrigerant in the evaporator from exchanging heat with the outside of the refrigerant circuit.

(C-18) The temperature adjustment system according to any one of C-10 to C-17, wherein a heater configured to heat the coolant in the coolant circuit is disposed in the coolant circuit, and wherein the management device is configured to control the compressor so as to recover the refrigerant from the refrigerant layer to the refrigerant circuit in a case in which the heater heats the coolant in the coolant circuit.

(D-1) A vehicle including:

a first refrigerant circuit including a first compressor, a first condenser, a first expansion valve, a second expansion valve, and an evaporator, the first refrigerant circuit being configured to circulate a refrigerant;

a second refrigerant circuit including a second compressor, a second condenser, and a third expansion valve, the second refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface;

a battery module group including a plurality of battery modules, the battery module group being disposed along the first surface of the heat exchanger plate;

a vehicle body that houses the first refrigerant circuit, the second refrigerant circuit, the coolant circuit, the heat exchanger plate, and the battery module group;

a first wheel and a second wheel that are coupled to the vehicle body; and an electric motor configured to drive the first wheel using electric power supplied from the battery module group, wherein the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exits from the coolant layer, and the coolant circuit is connected to the coolant input portion and the coolant output portion, wherein the second refrigerant circuit is connected to the refrigerant input portion and the refrigerant output portion, wherein the first refrigerant circuit includes a first refrigerant path and a second refrigerant path, the first refrigerant path and the second refrigerant path through which the refrigerant flows between the first condenser and the first compressor, wherein the first refrigerant path includes the first expansion valve and the evaporator, wherein the second refrigerant path includes a second electromagnetic valve and the second expansion valve, wherein the vehicle further includes a chiller configured to perform heat exchange between the coolant flowing through the coolant circuit and the refrigerant flowing through the first refrigerant circuit, and wherein the chiller is configured to allow heat exchange between the coolant flowing through the coolant circuit and the refrigerant flowing between the second expansion valve and the first compressor in the first refrigerant circuit.

(D-2) The vehicle according to D-1, further including:

a management device configured to manage the battery module group, wherein in response to the management device opening the second electromagnetic valve, an amount of the refrigerant flowing between the second expansion valve and the first compressor in the first refrigerant circuit increases, and wherein in response to the management device closing the second electromagnetic valve, the amount of the refrigerant flowing between the second expansion valve and the first compressor in the first refrigerant circuit decreases.

(D-3) The vehicle according to D-2, wherein the management device is configured to operate the pump while opening the second electromagnetic valve.

(D-4) The vehicle according to D-2 or D-3, wherein the management device is configured to open the second electromagnetic valve in a case in which the battery module group is rapidly charged.

(D-5) The vehicle according to D-2 or D-3, wherein the management device is configured to open the second electromagnetic valve in a case in which an average temperature of the battery modules included in the battery module group exceeds a predetermined value.

(D-6) The vehicle according to any one of D-1 to D-5, wherein the coolant circuit includes a heater configured to heat the coolant that flows into the heat exchanger plate.

(D-7) The vehicle according to D-6, wherein the management device is configured to control the first compressor, the second compressor, the second electromagnetic valve, and the heater such that the first compressor and the second compressor are stopped, the second electromagnetic valve is closed, and the heater is caused to heat the coolant that flows into the heat exchanger plate.

(D-8) A temperature adjustment system including:

a first refrigerant circuit including a first compressor, a first condenser, a first expansion valve, a second expansion valve, and an evaporator, the first refrigerant circuit being configured to circulate a refrigerant;

a second refrigerant circuit including a second compressor, a second condenser, and a third expansion valve, the second refrigerant circuit being configured to circulate a refrigerant;

a coolant circuit including a reservoir and a pump, the coolant circuit being configured to circulate a coolant;

a heat exchanger plate having a first surface and a second surface opposite to the first surface, the heat exchanger plate including a coolant layer in which a coolant flows between the first surface and the second surface and a refrigerant layer in which a refrigerant flows between the first surface and the second surface, wherein the heat exchanger plate is allowed to be housed in a vehicle body including a battery module group, the battery module group including a plurality of battery modules and disposed along the first surface of the heat exchanger plate, wherein the vehicle body is allowed to form a vehicle to which a first wheel and a second wheel are coupled, the vehicle includes an electric motor configured to drive the first wheel using electric power supplied from the battery module group, and the vehicle is allowed to travel using the first wheel and the second wheel, wherein at least a part of the coolant layer is disposed to overlap the refrigerant layer, wherein the heat exchanger plate includes a refrigerant input portion through which the refrigerant enters the refrigerant layer, and a refrigerant output portion through which the refrigerant exits from the refrigerant layer, wherein the heat exchanger plate includes a coolant input portion through which the coolant enters the coolant layer, and a coolant output portion through which the coolant exits from the coolant layer, and the coolant circuit is connected to the coolant input portion and the coolant output portion, wherein the second refrigerant circuit is connected to the refrigerant input portion and the refrigerant output portion, wherein the first refrigerant circuit includes a first refrigerant path and a second refrigerant path, the first refrigerant path and the second refrigerant path through which the refrigerant flows between the first condenser and the first compressor, wherein the first refrigerant path includes the first expansion valve and the evaporator, wherein the second refrigerant path includes a second electromagnetic valve and the second expansion valve, wherein the vehicle further includes a chiller configured to perform heat exchange between the coolant flowing through the coolant circuit and the refrigerant flowing through the first refrigerant circuit, and wherein the chiller is configured to allow heat exchange between the coolant flowing through the coolant circuit and the refrigerant flowing between the second expansion valve and the first compressor in the first refrigerant circuit.

(D-9) The temperature adjustment system according to D-8, further including:

a management device configured to manage the battery module group, wherein in response to the management device opening the second electromagnetic valve, an amount of the refrigerant flowing between the second expansion valve and the first compressor in the first refrigerant circuit increases, and wherein in response to the management device closing the second electromagnetic valve, the amount of the refrigerant flowing between the second expansion valve and the first compressor in the first refrigerant circuit decreases.

(D-10) The temperature adjustment system according to D-9, wherein the management device is configured to operate the pump while opening the second electromagnetic valve.

(D-11) The temperature adjustment system according to D-9 or D-10, wherein the management device is configured to open the second electromagnetic valve in a case in which the battery module group is rapidly charged.

(D-12) The temperature adjustment system according to D-9 or D-10, wherein the management device is configured to open the second electromagnetic valve in a case in which an average temperature of the battery modules included in the battery module group exceeds a predetermined value.

(D-13) The temperature adjustment system according to any one of D-8 to D-12, wherein the coolant circuit includes a heater configured to heat the coolant that flows into the heat exchanger plate.

(D-14) The temperature adjustment system according to D-13, wherein the management device is configured to control the first compressor, the second compressor, the second electromagnetic valve, and the heater such that the first compressor and the second compressor are stopped, the second electromagnetic valve is closed, and the heater is caused to heat the coolant that flows into the heat exchanger plate.

Embodiments of a vehicle, a heat exchanger plate, and a battery pack according to the present disclosure have been described above with reference to the drawings, and the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure.

The present application is based on Japanese Patent Application No. 2020-064392 filed on Mar. 31, 2020, Japanese Patent Application No. 2020-064389 filed on Mar. 31, 2020, Japanese Patent Application No. 2020-064390 filed on Mar. 31, 2020, Japanese Patent Application No. 2020-064391 filed on Mar. 31, 2020, and Japanese Patent Application No. 2020-058577 filed on Mar. 27, 2020.

A vehicle, a heat exchanger plate, and a battery pack according to the present disclosure are useful in a field in which it is desired to adjust the temperature of an in-vehicle battery.

What is claimed is:

1. A vehicle comprising:

a refrigerant circuit comprising a compressor, a condenser, an expansion valve, and an evaporator, the refrigerant circuit being configured to circulate a refrigerant;

a coolant circuit comprising a reservoir and a pump, the coolant circuit being configured to circulate a coolant;

a first heat exchanger plate having a first surface and a second surface opposite to the first surface, the first heat exchanger plate comprising a first coolant layer in which the coolant flows between the first surface and the second surface and a refrigerant layer in which the refrigerant flows between the first surface and the second surface;

a first battery module group comprising a plurality of first battery modules, the first battery module group being disposed along the first surface of the first heat exchanger plate;

a second heat exchanger plate having a third surface and a fourth surface opposite to the third surface, the second heat exchanger comprising a second coolant layer in which the coolant flows between the third surface and the fourth surface;

a second battery module group comprising a plurality of second battery modules, the second battery group being disposed along the third surface of the second heat exchanger plate;

a vehicle body that houses the refrigerant circuit, the coolant circuit, the first heat exchanger plate, the first battery module group, the second heat exchanger plate, and the second battery module group;

a first wheel and a second wheel that are coupled to the vehicle body; and an electric motor configured to drive the first wheel using electric power supplied from at least one of the first battery module group and the second battery module group, wherein the vehicle is allowed to travel in a first direction using the first wheel and the second wheel, wherein at least a part of the first coolant layer is disposed to overlap the refrigerant layer, wherein the first heat exchanger plate comprises a refrigerant input portion through which the refrigerant enters the refrigerant layer and a refrigerant output portion through which the refrigerant exits from the refrigerant layer, and the refrigerant circuit is connected to the refrigerant input portion and the refrigerant output portion, wherein the first heat exchanger plate comprises a coolant input portion through which the coolant enters the first coolant layer and a coolant output portion through which the coolant exits from the first coolant layer, and the coolant circuit is connected to the coolant input portion and the coolant output portion, and wherein the first coolant layer and the second coolant layer are connected to each other via a coolant layer connection passage.

2. The vehicle according to claim 1, wherein the refrigerant layer comprises a refrigerant passage through which the refrigerant flows from the refrigerant input portion toward the refrigerant output portion, wherein the refrigerant passage comprises at least a first refrigerant passage and a second refrigerant passage, wherein the refrigerant passage further comprises a branch portion that divides into the first refrigerant passage and the second refrigerant passage, and a coupling portion that couples the first refrigerant passage and the second refrigerant passage, wherein at least a part of the first refrigerant passage is disposed along a second direction perpendicular to the first direction, wherein at least a part of the second refrigerant passage is disposed along the second direction, and wherein the first coolant layer comprises a first coolant passage through which the coolant flows, a first portion of the first coolant passage is disposed along the first direction, a second portion of the first coolant passage is disposed along the first direction, the coolant in the first portion flows in the first direction, and the coolant in the second portion flows in a direction opposite to the first direction.

3. The vehicle according to claim 1, wherein no refrigerant layer in which the refrigerant flows is provided in the second heat exchanger plate.

4. The vehicle according to claim 1, wherein the refrigerant input portion and the refrigerant output portion are connected to the refrigerant circuit without the second heat exchanger plate intervening therebetween.

5. The vehicle according to claim 1, wherein heat is exchangeable between the coolant and the refrigerant in a portion where the first coolant layer and the refrigerant layer overlap each other.

6. The vehicle according to claim 1, further comprising:

one or more third heat exchanger plates housed in the vehicle body, the one or more third heat exchanger plates comprising one or more third coolant layer, respectively, each of the one or more third coolant layer in which the coolant flows, wherein the first coolant layer is connected to the one or more third heat exchanger plates via one or more second coolant layer connection passages, respectively.

7. A heat exchanger plate comprising:

a first surface;

a second surface opposite to the first surface;

a first coolant layer in which a coolant flows between the first surface and the second surface; and a refrigerant layer in which a refrigerant flows between the first surface and the second surface, wherein the heat exchanger plate is allowed to be housed in a vehicle body comprising a first battery module group, and the first battery module group comprises a plurality of first battery modules and is disposed along the first surface, wherein the vehicle body is allowed to further house: a refrigerant circuit comprising a compressor, a condenser, an expansion valve, and an evaporator, the refrigerant circuit being configured to circulate the refrigerant; a coolant circuit comprising a reservoir and a pump, the coolant circuit being configured to circulate the coolant; a second heat exchanger plate having a third surface and a fourth surface opposite to the third surface, the second heat exchanger plate comprising a second coolant layer in which the coolant flows between the third surface and the fourth surface; and a second battery module group comprising a plurality of second battery modules, the second battery module group being disposed along the third surface of the second heat exchanger plate, wherein the vehicle body is allowed to form a vehicle to which a first wheel and a second wheel are coupled, the vehicle comprises an electric motor configured to drive the first wheel using electric power supplied from at least one of the first battery module group and the second battery module group, and the vehicle is allowed to travel in a first direction using the first wheel and the second wheel, wherein at least a part of the first coolant layer is disposed to overlap the refrigerant layer, wherein the refrigerant layer comprises a refrigerant input portion through which the refrigerant enters the refrigerant layer and a refrigerant output portion through which the refrigerant exits from the refrigerant layer, and the refrigerant input portion and the refrigerant output portion are connectable to the refrigerant circuit, wherein the first coolant layer comprises a coolant input portion through which the coolant enters the first coolant layer and a coolant output portion through which the coolant exits from the first coolant layer, and the coolant input portion and the coolant output portion are connectable to the coolant circuit, and wherein the first coolant layer and the second coolant layer are connectable to each other via a coolant layer connection passage.

8. The heat exchanger plate according to claim 7, wherein the refrigerant layer comprises a refrigerant passage through which the refrigerant flows from the refrigerant input portion toward the refrigerant output portion, wherein the refrigerant passage comprises at least a first refrigerant passage and a second refrigerant passage, wherein the refrigerant passage further comprises a branch portion that divides into the first refrigerant passage and the second refrigerant passage, and a coupling portion that couples the first refrigerant passage and the second refrigerant passage, wherein at least a part of the first refrigerant passage is disposed along a second direction perpendicular to the first direction, wherein at least a part of the second refrigerant passage is disposed along the second direction, and wherein the first coolant layer comprises a first coolant passage through which the coolant flows, a first portion of the first coolant passage is disposed along the first direction, a second portion of the first coolant passage is disposed along the first direction, the coolant in the first portion flows in the first direction, and the coolant in the second portion flows in a direction opposite to the first direction.

9. The heat exchanger plate according to claim 7, wherein no refrigerant layer in which the refrigerant flows is provided in the second heat exchanger plate.

10. The heat exchanger plate according to claim 7, wherein the refrigerant input portion and the refrigerant output portion are connectable to the refrigerant circuit without the second heat exchanger plate intervening therebetween.

11. The heat exchanger plate according to claim 7, wherein heat is exchangeable between the coolant and the refrigerant in a portion where the first coolant layer and the refrigerant layer overlap each other.

12. The heat exchanger plate according to claim 7, wherein the vehicle body is allowed to further house one or more third heat exchanger plates, the one or more third heat exchanger plates comprising one or more third coolant layer, respectively, each of the one or more third coolant layer in which the coolant flows, and wherein the first coolant layer is connectable to the one or more third heat exchanger plates via one or more second coolant layer connection passages, respectively.

13. A battery pack comprising:

a first heat exchanger plate having a first surface and a second surface opposite to the first surface, the first heat exchanger plate comprising a coolant layer in which a coolant flows between the first surface and the second surface and a refrigerant layer in which a refrigerant flows between the first surface and the second surface; and a first battery module group comprising a plurality of first battery modules, the first battery module group being disposed along the first surface, wherein the battery pack is allowed to be housed in a vehicle body, wherein the vehicle body is allowed to further house: a refrigerant circuit comprising a compressor, a condenser, an expansion valve, and an evaporator, the refrigerant circuit being configured to circulate the refrigerant; a coolant circuit comprising a reservoir and a pump, the coolant circuit being configured to circulate the coolant; a second heat exchanger plate having a third surface and a fourth surface opposite to the third surface, the second heat exchanger plate comprising a second coolant layer in which the coolant flows between the third surface and the fourth surface; and a second battery module group comprising a plurality of second battery modules, the second battery module group being disposed along the third surface of the second heat exchanger plate, wherein the vehicle body is allowed to form a vehicle to which a first wheel and a second wheel are coupled, the vehicle comprises an electric motor configured to drive the first wheel using electric power supplied from at least one of the first battery module group and the second battery module group, and the vehicle is allowed to travel in a first direction using the first wheel and the second wheel, wherein at least a part of the first coolant layer is disposed to overlap the refrigerant layer, wherein the first heat exchanger plate comprises a refrigerant input portion through which the refrigerant enters the refrigerant layer and a refrigerant output portion through which the refrigerant exits from the refrigerant layer, and the refrigerant input portion and the refrigerant output portion are connectable to the refrigerant circuit, wherein the first heat exchanger plate comprises a coolant input portion through which the coolant enters the first coolant layer and a coolant output portion through which the coolant exits from the first coolant layer, and the coolant input portion and the coolant output portion are connectable to the coolant circuit, and wherein the first coolant layer and the second coolant layer are connectable to each other via a coolant layer connection passage.

14. The battery pack according to claim 13, wherein the refrigerant layer comprises a refrigerant passage through which the refrigerant flows from the refrigerant input portion toward the refrigerant output portion, wherein the refrigerant passage comprises at least a first refrigerant passage and a second refrigerant passage, wherein the refrigerant passage further comprises a branch portion that divides into the first refrigerant passage and the second refrigerant passage, and a coupling portion that couples the first refrigerant passage and the second refrigerant passage, wherein at least a part of the first refrigerant passage is disposed along a second direction perpendicular to the first direction, wherein at least a part of the second refrigerant passage is disposed along the second direction, and wherein the first coolant layer comprises a first coolant passage through which the coolant flows, a first portion of the first coolant passage is disposed along the first direction, a second portion of the first coolant passage is disposed along the first direction, the coolant in the first portion flows in the first direction, and the coolant in the second portion flows in a direction opposite to the first direction.

15. The battery pack according to claim 13, wherein no refrigerant layer in which the refrigerant flows is provided in the second heat exchanger plate.

16. The battery pack according to claim 13, wherein the refrigerant input portion and the refrigerant output portion are connectable to the refrigerant circuit without the second heat exchanger plate intervening therebetween.

17. The battery pack according to claim 13, wherein heat is exchangeable between the coolant and the refrigerant in a portion where the first coolant layer and the refrigerant layer overlap each other.

18. The battery pack according to claim 13, wherein the vehicle body is allowed to further house one or more third heat exchanger plates, the one or more third heat exchanger plates comprising one or more third coolant layer, respectively, each of the one or more third coolant layer in which the coolant flows, and wherein the first coolant layer is connectable to the one or more third heat exchanger plates via one or more second coolant layer connection passages, respectively.

* * * * *